(12) United States Patent
Hayakawa et al.

(10) Patent No.: US 12,043,247 B2
(45) Date of Patent: Jul. 23, 2024

(54) PARKING ASSIST APPARATUS

(71) Applicants: DENSO CORPORATION, Kariya (JP); TOYOTA JIDOSHA KABUSHIKI KAISHA, Toyota (JP)

(72) Inventors: Yoshiki Hayakawa, Kariya (JP); Yuki Minase, Toyota (JP); Motonari Ohbayashi, Toyota (JP); Masumi Fukuman, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 17/337,258

(22) Filed: Jun. 2, 2021

(65) Prior Publication Data

US 2021/0284140 A1    Sep. 16, 2021

Related U.S. Application Data

(63) Continuation of application No. PCT/JP2019/044717, filed on Nov. 14, 2019.

(30) Foreign Application Priority Data

Dec. 4, 2018 (JP) ................................. 2018-227570

(51) Int. Cl.
*B60W 30/06* (2006.01)
*B60W 10/18* (2012.01)
(Continued)

(52) U.S. Cl.
CPC ............ *B60W 30/06* (2013.01); *B60W 10/18* (2013.01); *B60W 30/09* (2013.01); *B60W 50/0205* (2013.01); *B60W 2050/0215* (2013.01)

(58) Field of Classification Search
CPC ...... B60W 30/00; B60W 30/06; B60W 30/09; B60W 30/0965; B60W 10/02;
(Continued)

(56) References Cited

U.S. PATENT DOCUMENTS

2013/0085637 A1* 4/2013 Grimm .............. B62D 15/0285
701/25
2015/0166059 A1* 6/2015 Ko ............................ B60T 7/22
701/28
(Continued)

FOREIGN PATENT DOCUMENTS

JP    2010-195118 A    9/2010
JP    2017-165296 A    9/2017
(Continued)

OTHER PUBLICATIONS

NPL Search (Jul. 11, 2023).*

*Primary Examiner* — Van T Trieu
(74) *Attorney, Agent, or Firm* — MASCHOFF BRENNAN

(57) ABSTRACT

Provided is an obstacle detecting unit that acquires a detection signal based on a distance between a vehicle and an obstacle around the vehicle; an image acquiring unit that acquires an image signal corresponding to an image around the vehicle; and a control unit that executes, based on the detection signal and the image signal, an automatic parking process detecting the parking space and parking the vehicle in the parking space. The control unit is configured to execute, when executing the automatic parking process, a fault handling process depending on a state of the automatic parking process in the case where a fault occurs in either the obstacle detecting unit or the image acquiring unit.

7 Claims, 16 Drawing Sheets

(51) Int. Cl.
*B60W 30/09* (2012.01)
*B60W 50/02* (2012.01)

(58) Field of Classification Search
CPC ...... B60W 10/06; B60W 10/10; B60W 10/18; B60W 10/20; B60W 50/02; B60W 50/14; G06K 9/00; G06K 9/00805; G06K 9/00812; B62D 15/02
See application file for complete search history.

(56) References Cited

U.S. PATENT DOCUMENTS

| | | |
|---|---|---|
| 2016/0375897 A1* | 12/2016 | Shimizu ............. B62D 15/0285 701/70 |
| 2017/0169627 A1 | 6/2017 | Kim et al. |
| 2017/0270798 A1 | 9/2017 | Ushiba et al. |
| 2018/0186365 A1* | 7/2018 | Kim ..................... B60W 30/06 |
| 2019/0061775 A1 | 2/2019 | Emura et al. |
| 2019/0176839 A1* | 6/2019 | Mukai .................. G06V 10/811 |
| 2019/0236862 A1* | 8/2019 | Mercep .................. G08G 1/165 |
| 2020/0139987 A1 | 5/2020 | Sekiguchi |
| 2020/0166349 A1* | 5/2020 | Ogata ................. G01C 21/3881 |

FOREIGN PATENT DOCUMENTS

| | | |
|---|---|---|
| JP | 2017-178267 A | 10/2017 |
| JP | 6400249 B1 | 10/2018 |
| WO | 2019/181265 A1 | 9/2019 |

* cited by examiner

FIG.6A

○ : NORMAL  △ : PARTIAL FAULT  × : FAULT

| F SONAR | F CAMERA | LS SONAR | LS CAMERA | PROCESS OF MAIN CONTROL UNIT |
|---|---|---|---|---|
| ○ | ○ | ○ | ○ | FIRST PARKING SPACE DETECTING PROCESS |
| ○ | × | ○ | ○ | SECOND PARKING SPACE DETECTING PROCESS |
| × | ○ | ○ | ○ | SECOND PARKING SPACE DETECTING PROCESS |
| × | × | ○ | ○ | NA |
| ○ | ○ | ○ | × | SECOND PARKING SPACE DETECTING PROCESS (FIRST PARKING SPACE PROCESS EXCEPT FOR WHITE LINE RECOGNITION) |
| ○ | ○ | △ | ○ | SECOND PARKING SPACE DETECTING PROCESS |
| ○ | ○ | △ | × | SECOND PARKING SPACE DETECTING PROCESS (FIRST PARKING SPACE PROCESS EXCEPT FOR WHITE LINE RECOGNITION) |
| ○ | ○ | × | ○ | SECOND PARKING SPACE DETECTING PROCESS (NA IN CASE WHERE NO WHITE LINE IS PRESENT) |
| ○ | ○ | × | × | NA |
| ○ | × | ○ | × | SECOND PARKING SPACE DETECTING PROCESS (FIRST PARKING SPACE PROCESS EXCEPT FOR WHITE LINE RECOGNITION) |
| ○ | × | △ | × | SECOND PARKING SPACE DETECTING PROCESS (FIRST PARKING SPACE PROCESS EXCEPT FOR WHITE LINE RECOGNITION) |
| ○ | × | △ | ○ | SECOND PARKING SPACE DETECTING PROCESS |
| ○ | × | × | ○ | SECOND PARKING SPACE DETECTING PROCESS (NA IN CASE WHERE NO WHITE LINE IS PRESENT) |
| × | ○ | ○ | × | SECOND PARKING SPACE DETECTING PROCESS (FIRST PARKING SPACE PROCESS EXCEPT FOR WHITE LINE RECOGNITION) |
| × | ○ | △ | × | SECOND PARKING SPACE DETECTING PROCESS (FIRST PARKING SPACE PROCESS EXCEPT FOR WHITE LINE RECOGNITION) |
| × | ○ | △ | ○ | SECOND PARKING SPACE DETECTING PROCESS |
| × | ○ | × | ○ | SECOND PARKING SPACE DETECTING PROCESS (NA IN CASE WHERE NO WHITE LINE IS PRESENT) |

FIG.6B

○: NORMAL  △: PARTIAL FAULT  ×: FAULT

| F SONAR | F CAMERA | RS SONAR | RS CAMERA | PROCESS OF MAIN CONTROL UNIT |
|---------|----------|----------|-----------|------------------------------|
| ○ | ○ | ○ | ○ | FIRST ANGLE ADJUSTING PROCESS |
| ○ | × | ○ | ○ | SECOND ANGLE ADJUSTING PROCESS |
| × | ○ | ○ | ○ | SECOND ANGLE ADJUSTING PROCESS |
| × | × | ○ | ○ | NA |
| ○ | ○ | ○ | × | SECOND ANGLE ADJUSTING PROCESS |
| ○ | ○ | △ | ○ | SECOND ANGLE ADJUSTING PROCESS |
| ○ | ○ | △ | × | SECOND ANGLE ADJUSTING PROCESS |
| ○ | ○ | × | ○ | SECOND ANGLE ADJUSTING PROCESS |
| ○ | ○ | × | × | NA |
| ○ | × | ○ | × | SECOND ANGLE ADJUSTING PROCESS |
| ○ | × | △ | × | SECOND ANGLE ADJUSTING PROCESS |
| ○ | × | △ | ○ | SECOND ANGLE ADJUSTING PROCESS |
| ○ | × | × | ○ | SECOND ANGLE ADJUSTING PROCESS |
| × | ○ | ○ | × | SECOND ANGLE ADJUSTING PROCESS |
| × | ○ | △ | × | SECOND ANGLE ADJUSTING PROCESS |
| × | ○ | △ | ○ | SECOND ANGLE ADJUSTING PROCESS |
| × | ○ | × | ○ | SECOND ANGLE ADJUSTING PROCESS |

FIG.6C

○ : NORMAL  △ : PARTIAL FAULT  × : FAULT

| R SONAR | R CAMERA | RS SONAR | RS CAMERA | PROCESS OF MAIN CONTROL UNIT |
|---|---|---|---|---|
| ○ | ○ | ○ | ○ | FIRST PARKING PROCESS |
| ○ | × | ○ | ○ | SECOND PARKING PROCESS |
| × | ○ | ○ | ○ | SECOND PARKING PROCESS |
| × | × | ○ | ○ | NA |
| ○ | ○ | ○ | × | SECOND PARKING PROCESS |
| ○ | ○ | △ | ○ | SECOND PARKING PROCESS |
| ○ | ○ | △ | × | SECOND PARKING PROCESS |
| ○ | ○ | × | ○ | SECOND PARKING PROCESS |
| ○ | ○ | × | × | NA |
| ○ | × | ○ | × | SECOND PARKING PROCESS |
| ○ | × | △ | × | SECOND PARKING PROCESS |
| ○ | × | △ | ○ | SECOND PARKING PROCESS |
| ○ | × | × | ○ | SECOND PARKING PROCESS |
| × | ○ | ○ | × | SECOND PARKING PROCESS |
| × | ○ | △ | × | SECOND PARKING PROCESS |
| × | ○ | △ | ○ | SECOND PARKING PROCESS |
| × | ○ | × | ○ | SECOND PARKING PROCESS |

PARKING ASSIST APPARATUS

CROSS REFERENCE TO RELATED APPLICATION

This application is the U.S. bypass application of International Application No. PCT/JP2019/44717 filed on Nov. 14, 2019, which designated the U.S. and claims priority to Japanese Patent Application No. 2018-227570, filed Dec. 4, 2018, the contents of both of these are incorporated herein by reference.

BACKGROUND

Technical Field

The present disclosure relates to parking assist apparatuses.

Description of the Related Art

Conventionally, a parking assist apparatus has been proposed in which an automatic parking process is executed to allow an own vehicle to be automatically parked in a parking space based on information from a plurality of sensors mounted on a vehicle.

SUMMARY

According to one aspect of the present disclosure, a parking assist apparatus mounted on a vehicle and configured to assist parking of the vehicle in a parking space includes: an obstacle detecting unit that acquires a detection signal based on a distance between the vehicle and an obstacle around the vehicle; an image acquiring unit that acquires an image signal corresponding to an image around the vehicle; and a control unit that executes, based on the detection signal and the image signal, an automatic parking process detecting the parking space and parking the vehicle in the parking space.

Note that reference numbers in brackets assigned to respective elements indicate an example of correspondence relationship between the elements and specific components in embodiments which will be described later.

BRIEF DESCRIPTION OF THE DRAWINGS

In the accompanying drawings:

FIG. 6A is a table showing a relationship between a state of a sonar and a camera used when executing a parking space detecting process, and a processing state of a main control unit;

FIG. 6B is a table showing a relationship between a state of a sonar and a camera used when executing an angle adjusting process, and a processing state of the main control unit;

FIG. 6C is a table showing a relationship between a state of a sonar and a camera used when executing a parking process, and a processing state of a main control unit;

DETAILED DESCRIPTION OF THE PREFERRED EMBODIMENTS

Conventionally, a parking assist apparatus has been proposed in which an automatic parking process is executed to allow an own vehicle to be automatically parked in a parking space based on information from a plurality of sensors mounted on a vehicle.

For example, JP-A-2017-178267 discloses such a parking assist apparatus. Specifically, according to this parking assist apparatus, faults in respective sensors are detected and when determined that a fault has occurred, the occurrence of the fault is displayed on a display device or the like which are mounted on a vehicle, thereby notifying an occupant.

In the above-described parking assist apparatus, a fault state of the respective sensors is displayed on a display device or the like mounted on a vehicle. However, the ability to perform an automatic parking process when a fault has occurred on a sensor is not determined. Hence, for example, when a configuration is adopted where the automatic parking process is inevitably terminated when a fault has occurred on a sensor, even when a fault has occurred on a sensor which is not used in the automatic parking process, the automatic parking process is terminated as well. Accordingly, in the above-described parking assist apparatus, sometimes occupants cannot effectively utilize the automatic parking process.

Hereinafter, with reference to the drawings, embodiments of the present disclosure will be described. Note that the same reference numbers are applied to mutually the same or equivalent portions in the following embodiments.

First Embodiment

Figure 1:
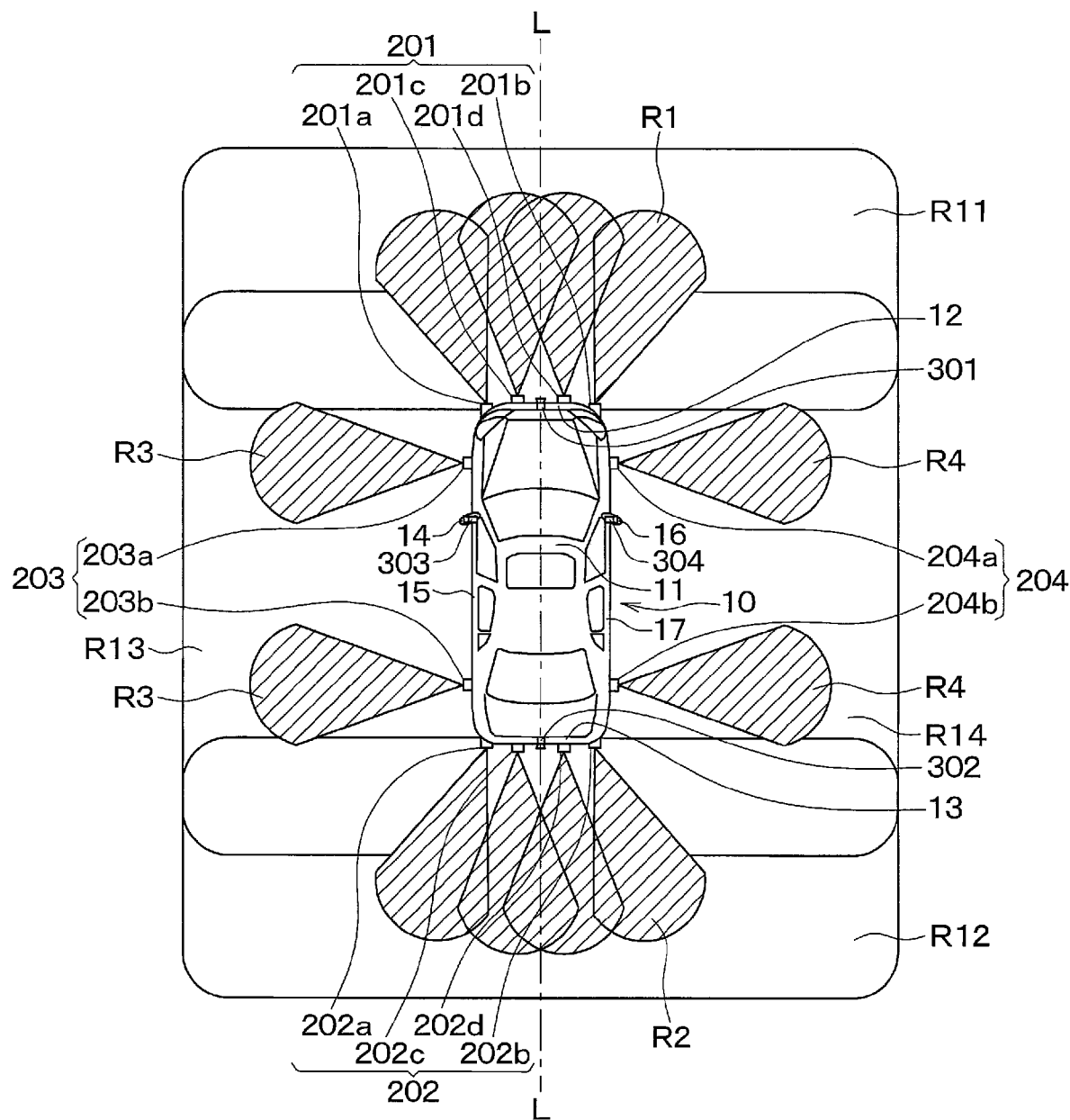
FIG. 1 is a diagram showing an outline configuration of a vehicle provided with a parking assist apparatus mounted thereon according to a first embodiment.

With reference to the drawings, a first embodiment will be described. The parking assist apparatus 1 according to the present embodiment is mounted on a vehicle 10 and configured to assist parking of a vehicle 100 for parking in a parking space PS. In the following, as shown in FIG. 1, as a vehicle 10, a general four-wheeled vehicle with a vehicle body 11 having a substantially rectangular shape in plan view is exemplified. Note that a direction defining a vehicle width of the vehicle 10 is referred to as a vehicle width direction. In FIG. 1, the vehicle width direction is a left-right direction on the paper surface. In the following, a direction orthogonal to the vehicle width direction of the vehicle 10 and a height direction of the vehicle 10 is referred to as a front-back direction. Further, in the following, a virtual line passing through the center of the vehicle 10, extending in the front-back direction is referred to as a vehicle center line L. In the following, a front side is defined as a one side (upper side in FIG. 1) of a direction parallel to the vehicle center line L, and a rear side is defined as the other side (lower side in FIG. 1) of the direction parallel to the vehicle center line L. A right side is defined as a right side of the vehicle width direction of the vehicle 10, and a left side is defined as a left side of the vehicle width direction.

Figure 2:
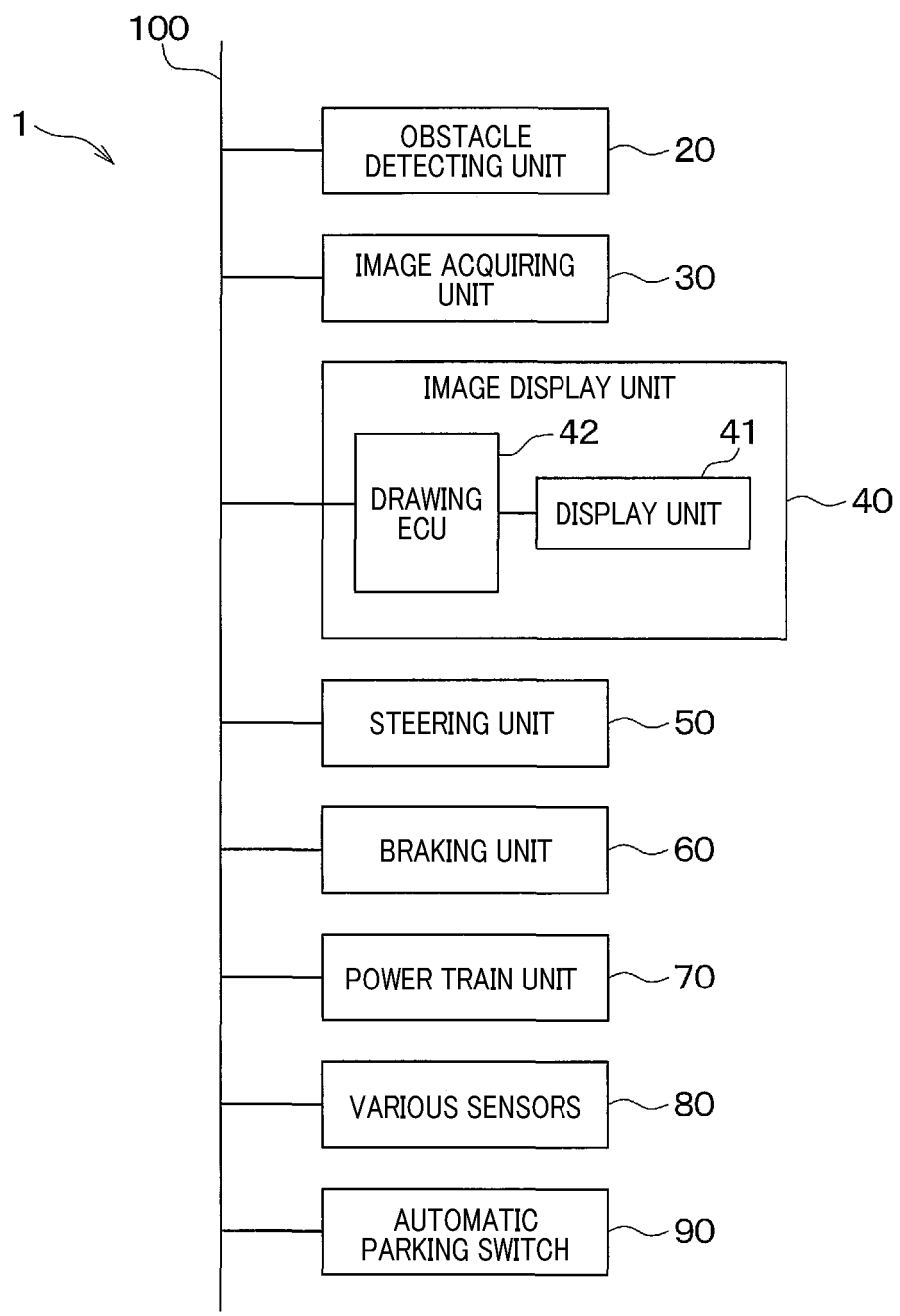
FIG. 2 is a block diagram showing a configuration of the parking assist apparatus.

As shown in FIG. 2, the parking assist apparatus 1 is configured to have an obstacle detecting unit 20, an image acquiring unit 30, an image display unit 40, a steering unit 50, a braking unit 60, a power train unit 70, sensors 80, an automatic parking switch 90 and the like. The obstacle detecting unit 20, the image acquiring unit 30, the image display unit 40, the steering unit 50, the braking unit 60, the power train unit 70, the sensors 80, and the automatic parking switch 90 are mutually connected via an on-vehicle communication bus 100.

Figure 3:
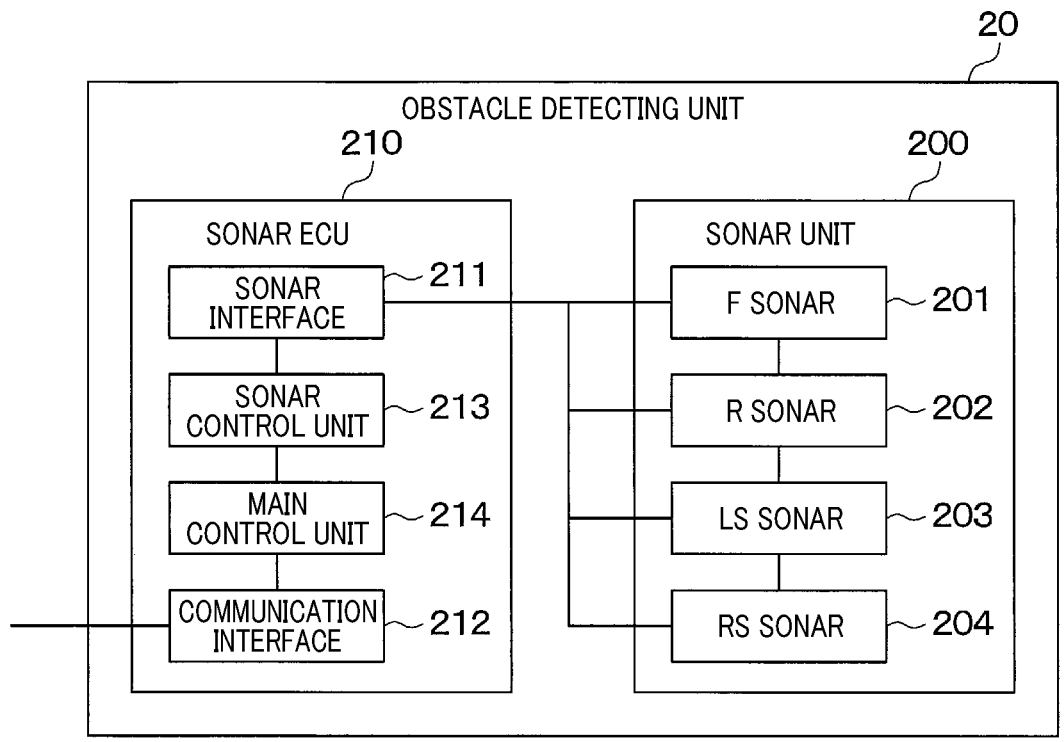
FIG. 3 is a block diagram showing a configuration of an obstacle detecting unit.

As shown in FIG. 3, the obstacle detecting unit 20 is provided with a sonar unit 200, and a sonar ECU 210 and the like. Specifically, the sonar unit 200 includes a front (hereinafter referred to as F) sonar 201, a rear (hereinafter referred to as R) sonar 202, a left side (hereinafter referred to as LS) sonar 203, and a right side (hereinafter referred to as RS) sonar 204. The F sonar 201, the R sonar 202, the LS sonar 203 and the RS sonar 204 are each configured to emit probing waves towards outside the vehicle 10 and receive reception waves including reflection waves of the proving waves reflected at the obstacle, having an intensity depending on the distance between the vehicle 10 and the obstacle. The F sonar 201, the R sonar 202, the LS sonar 203 and the RS sonar 204 each output a detection signal in accordance with the received waves. According to the present embodiment, the respective sonars 201 to 204 correspond to detecting unit.

Hereinafter, arrangement positions of the sonars 201 to 204 will be described with reference to FIG. 1. In FIG. 1, hatching is provided for the detection regions R1 to R4 in order to easily understand the detection regions R1 to R4 of the sonars 201 to 204. Also, in FIGS. 5A to 5C which will be described later, a hatching is appropriately given to the detection regions R1 to R4 in order to easily understand the detection regions R1 to R4 of the sonars 201 to 204.

According to the present embodiment, as shown in FIG. 1, the F sonar 201 includes first to fourth F sonars 201a to 201d, which are mounted, for example, to a front bumper 12 of the vehicle body to detect obstacles located in the front side of the vehicle 10. Specifically, the first F sonar 201a is disposed at a left front corner part of the vehicle body 11. The second F sonar 201b is disposed at a right front corner part of the vehicle body 11. The first F sonar 201a and the second F sonar 201b are arranged symmetrically with respect to the vehicle center line L. The third F sonar 201c is disposed between the first F sonar 201a and the vehicle center line L. The fourth F sonar 201d is disposed between the second F sonar 201b and the vehicle center line L. Further, the third F sonar 201c and the fourth F sonar 201d are symmetrically arranged with respect to the vehicle center line L.

The R sonar 202 includes first to fourth sonars 202a to 202d, and these are mounted, for example, to a rear bumper 13 of the vehicle 11 to detect an obstacle located in the rear side of the vehicle 10. The first R sonar 202a is disposed at a left rear corner part of the vehicle body 11. The second R sonar 202b is disposed at a right rear corner part of the vehicle body 11. The first R sonar 202a and the second R sonar 202b are arranged symmetrically with respect to the vehicle center line L. The third R sonar 202c is disposed between the first R sonar 202a and the vehicle center line L. The fourth R sonar 202d is disposed between the second R sonar 202b and the vehicle center line L. Further, the third R sonar 202c and the fourth R sonar 202d are symmetrically arranged with respect to the vehicle center line L.

According to the present embodiment, the first to fourth F sonars 201a to 201d are arranged such that detection regions of adjacent sonars are overlapped.

The first to fourth F sonars 201a to 201d are connected integrally, and configured to output one overall detection signal. That is, according to the present embodiment, the first to fourth F sonars 201a to 201d have a detection region R1 as a whole in the front range of the vehicle 10. The F sonar 201 according to the present embodiment becomes in a fault state as a whole even when a fault has occurred on any one of the first to fourth F sonars 201a to 201d. Similarly, according to the present embodiment, the first to fourth R sonars 202a to 202d are arranged such that detection regions of adjacent sonars are overlapped. The first to fourth R sonars 202a to 202d are connected integrally, and configured to output one detection signal as a whole. That is, according to the present embodiment, the first to fourth R sonars 202a to 202d constitute a detection region R2 as a whole in the rear range of the vehicle 10. The R sonar 202 according to the present embodiment becomes in a fault state as a whole even when a fault has occurred on any one of the first to fourth R sonars 202a to 202d.

The LS sonar 203 includes first and second LS sonars 203a and 203b, and disposed at a left side in the vehicle width direction in the vehicle body 11 to detect an obstacle in the left side of the vehicle 10. Specifically, the first LS sonar 203a is disposed between a left side door mirror 14 and the first F sonar 201a with respect to the front-back direction of the vehicle body 11. The second LS sonar 203b is disposed between a left side door panel 15 and the first R sonar 202a with respect to the front-back direction of the vehicle body 11.

A RS sonar 204 includes a first RS sonar 204a and a second RS sonar 204b, and is disposed in the right side in the vehicle width direction of the vehicle body 11 to detect an obstacle located in the right side of the vehicle 10. Specifically, the first RS sonar 204a is disposed between the right side door mirror 16 and the second F sonar 201b in the front-back direction of the vehicle body 11. The first LS sonar 203a and the first RS sonar 204a are arranged symmetrically with respect to the vehicle center line L. The second RS sonar 204b is disposed between the right side door panel 17 and the second R sonar 202b in the front-back direction of the vehicle body 11. The second LS sonar 203b and the second RS sonar 204b are arranged symmetrically with respect to the vehicle center line L.

According to the present embodiment, the first and second LS sonars 203a and 203b are separately disposed from each other and are configured to each output a detection signal. In other words, the first LS sonar 203a and the second LS sonar 203b each constitutes a detection region R3 in the left side of the vehicle 10. Therefore, according to the present embodiment, the first LS sonar 203a and the second LS sonar 203b will not be in a fault state even if a fault has occurred on any one of the sonars.

Similarly, the first and second RS sonars 204a and 204b are separately disposed from each other and are configured to each output a detection signal. In other words, the first RS sonar 204a and the second RS sonar 204b each has a detection region R4 in the right side of the vehicle 10. Therefore, according to the present embodiment, the first RS sonar 204a and the second RS sonar 204b will not be in a fault state even if a fault has occurred on any one of the sonars.

As shown in FIG. 3, the sonar ECU 210 is configured to include a sonar interface 211, a communication interface 212, a sonar control unit 213 and a main control unit 214. The sonar interface 211 is an interface for a communication between respective sonars 201 to 204 and the sonar control unit 213. The communication interface 212 is an interface for communication between the main control unit 214 and an on-vehicle communication bus 100. Note that ECU is an abbreviation of Electronic Control Unit. The same applies to other ECUs which will be described later.

The sonar control unit 213 and the main control unit 214 is each configured as an on-vehicle microcomputer including a CPU, a ROM, a RAM, a non-volatile RAM and the like (not shown). CPU is an abbreviation of Central Processing Unit, ROM is an abbreviation of Read Only Memory, and RAM is an abbreviation of Random Access Memory. The sonar control unit 213 and the main control unit 214 read programs (i.e. respective routines which will be described later) from the ROM or the non-volatile RAM and execute them to accomplish various control operations. Note that various data (e.g. initial value, a look-up table, a map and the like) used for executing the programs is stored in advance in the ROM or the non-volatile RAM. The recording media such as ROM is configured as a non-transitory tangible recording media.

The sonar control unit 213 is connected to the F sonar 201, the R sonar 202, the LS sonar 203 and the RS sonar 204 via the sonar interface 211, and also connected to the main control unit 214. Then, the sonar control unit 213 determines, based on the detection signals from the respective sonars 201 to 204, whether a fault has occurred on the respective sonars 201 to 204. For example, the sonar control unit 213 determines, when no detection signal is transmitted from a sonar, that a fault has occurred on the sonar where no detection signal is detected. Further, the sonar control unit 213 determines, when a detection signal exceeding a predetermined threshold is transmitted from a sonar, that a fault has occurred on the sonar which transmits the detection signal exceeding the predetermined threshold. Then, the sonar control unit 213 outputs the detection signals from the respective sonars 201 to 204 and fault states of the respective sonars 201 to 204 to the main control unit 214.

As described, according to the present embodiment, the F sonar 201 is configured such that the first to fourth F sonars 201a to 201d are integrally connected. Hence, when at least one of the first to fourth sonars 201a to 201d has a fault, the F sonar 201 determines that a fault has occurred as a whole. Similarly, the R sonar 202 includes the first to fourth R sonars 202a to 202d. When at least one of the first to fourth R sonars 202a to 202d has a fault, the R sonar 202 determines that a fault has occurred as a whole. On the other hand, the LS sonar 203 is configured to include the first LS sonar 203a and the second LS sonar 203b which are mutually separated. Accordingly, the LS sonar 203 is not determined to have a fault as a whole even when either one of the first LS sonar 203a or the second LS sonar 203b has a fault, but determines that a part of the sonar has a fault. Similarly, the RS sonar 204 is not determined to have a fault as a whole even when either one of the first RS sonar 204a or the second RS sonar 204b has a fault, but determines that a part of the sonar has a fault.

The main control unit 214 has a function for performing a predetermined process based on a detection signal of the sonar unit 200, an image signal of the camera unit 300 which will be described later, detection signals from various sensors 80 and the like. Specifically, the main control unit 214 has a function in which the steering unit 50, the braking unit 60, the power train unit 70 are appropriately controlled, thereby executing assist driving of the vehicle 10, and a function in which an automatic parking process of the vehicle 10 is executed. The main control unit 214 executes an automatic parking process based on the detection signal and fault information from the sonar control unit 213, an image signal and fault information from the camera control unit 313. Also, the main control unit 214 executes, when executing the automatic parking process, a process of displaying an image corresponding to a display 41 which will be described later in the image display unit 40.

Figure 4:
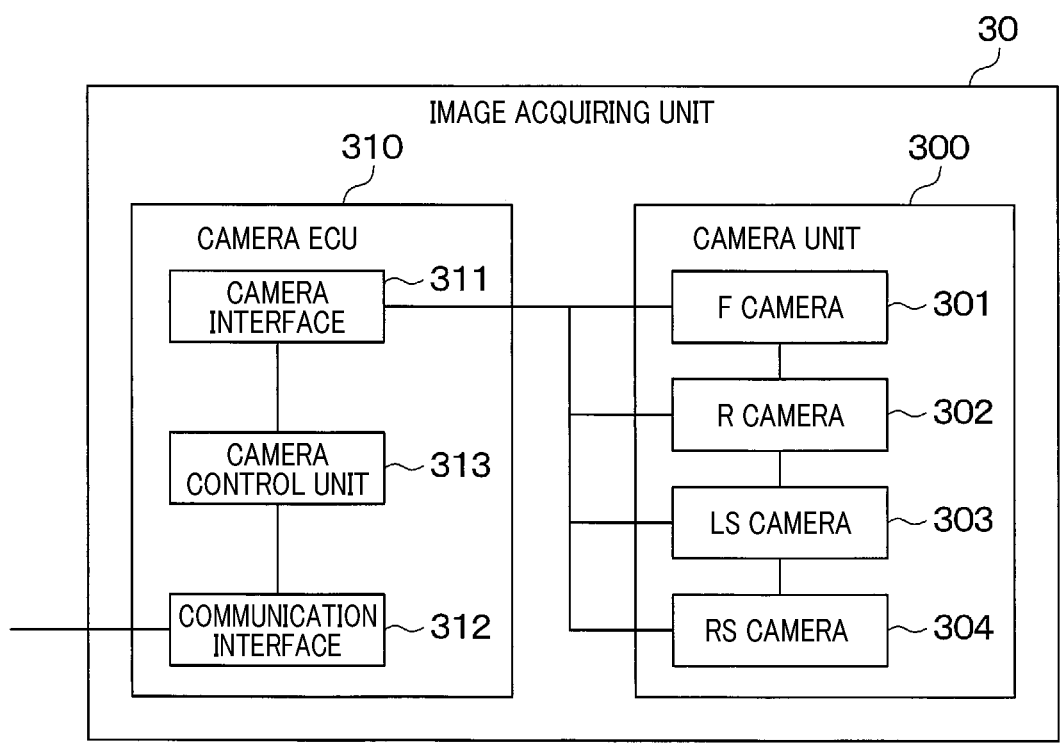
FIG. 4 is a block diagram showing a configuration of an image acquiring unit.

As shown in FIG. 4, the image acquiring unit 30 is provided with a camera 300, a camera ECU 310 and the like. Specifically, the camera 300 includes a F camera 301, a R camera 302, a LS camera 303 and a RS camera 304. The F camera 301, the LS camera 303 and the RS camera 304 are each configured as an image sensor such as a charge coupled element (i.e. CCD). The F camera 301, the R camera 302, the LS camera 303 and the RS camera 304 each output an image signal depending on a situation around the vehicle 10. According to the present embodiment, the cameras 301 to 304 correspond to imaging unit.

Hereinafter, positions where the respective cameras 301 to 304 will be described with reference to FIG. 1. Note that detection regions of the respective cameras 301 to 304 are labeled by R11 to R14.

According to the present embodiment, the F camera 301 is mounted to a front side portion of the vehicle body 11 so as to acquire an image signal corresponding to the detection region R11 ahead of the vehicle 10. The R camera 302 is mounted to a rear side portion of the vehicle 11 so as to acquire an image signal corresponding to the detection region R12 in the rear side of the vehicle 10. The LS camera 303 is mounted to, for example, the left side door mirror 14 so as to acquire an image signal corresponding to the detection region R13 in the left side of the vehicle 10. The RS camera 304 is mounted to the right side door mirror 16 so as to acquire an image signal corresponding to the detection region R14 in the right side of the vehicle 10.

The camera ECU 310 is configured to include a camera interface 311, a communication interface 312, a camera control unit 313 and the like. The camera interface 311 serves as an interface for a communication between the respective cameras 301 to 304, and the camera control unit 313. The communication interface 312 serves as an interface for a communication between the camera control unit 313 and the on-vehicle communication bus 100.

The camera control unit 313 is configured as, similar to that of the sonar control unit 213 or the like, an on-vehicle microcomputer provided with a CPU, a ROM, a RAM, a non-volatile RAM and the like. The camera control unit 313 reads programs (i.e. respective routines which will be described later) from the ROM or the non-volatile RAM and executes them to accomplish various control operation. Note that various data (e.g. initial value, a look-up table, a map and the like) used for executing the programs is stored in advance in the ROM or the non-volatile RAM. The recording media such as ROM is configured as a non-transitory tangible recording media.

The camera control unit 313 is connected to the F camera 301, the R camera 302, the LS camera 303 and the RS camera 304 via the camera interface 311. The camera control unit 313 determines whether a fault has occurred on the respective cameras 301 to 304 based on image signals of images captured by the cameras 301 to 304. For example, when no signal is transmitted from a camera, the camera control unit 313 determines that a fault has occurred on the camera where no signal is detected. Also, the camera control unit 313 determines, in the case where an image in a specific region (pixels) is not changed even when the image signal is transmitted, that a fault has occurred on the camera transmitting corresponding image signal. Then, the camera control unit 313 outputs fault states of the respective cameras 301 to 304 together with the image signals to the main control unit 214.

For example, it is expected that when only a specific region is not changed, this may be because of water droplets or snow adhered to the camera. In this case, the reliability of the image signal is lowered. Hence, according to the present embodiment, even for this case, a fault of the camera can be detected.

As shown in FIG. 2, the image display unit 40 is provided with a display unit 41 and a drawing ECU 42 or the like. The display unit 41 is disposed, for example, in the vicinity of the center of an instrument panel or in a combination meter provided in front of the driver's seat. The display unit 41 is configured of a device capable of displaying images with full-color, such as a liquid crystal display unit or an organic EL display unit or the like. The display unit 41 may be configured as a head-up display device or a touch panel capable of being operated by the occupant.

The drawing ECU 42 is provided with a drawing control unit or the like (now shown), which draws a map of the surrounding area of the vehicle 10, or draws an image on the display device 41 based on occupant's operation. Further, in the case where an automatic parking process is being performed, the drawing ECU 42 is configured to draw an image corresponding to an automatic parking process. In this case, when a fault has occurred on the respective sonars 201 to 204 and the respective cameras 301 to 304, the drawing ECU 42 draws the corresponding image on the display unit 41.

The steering unit 50 is provided with a steering sensor and a steering ECU (not shown) or the like. Then, in the case where an assist driving of the vehicle 10 is performing, the steering unit 50 controls the travelling direction of the vehicle 10 in accordance with a control signal transmitted from the main control unit 214.

The braking unit 60 is provided with a brake sensor, a brake ECU or the like (not shown). The braking unit 60 produces a braking force based on the control signal transmitted from the main control unit 214, when an assist driving of the vehicle 10 is performing, and automatically stops the vehicle 10. In the case where a hydraulic brake is provided, the braking unit 60 controls an actuator provided in a hydraulic circuit of the hydraulic brake, thereby controlling the braking force. Also, in the case where a motor is provided as a driving force, the braking unit 60 adjusts the braking force using regenerative braking by controlling the supply power to the motor.

The power train unit 70 is provided with a driving source mounted on the vehicle 10, a transmission mechanism transmitting a driving force of the driving source to the driving wheels, and a power train ECU or the like. The power train unit 70 adjusts, when the assist driving of the vehicle 10 is being performed, the driving force in accordance with a control signal transmitted from the main control unit 214. In the case where the driving force is an internal combustion engine, the power train unit 70 controls the opening of a throttle device or a fuel injection quantity, thereby adjusting the driving force. Further, for example, when the driving force is a motor, the power train unit 70 controls the supply power to the motor, thereby adjusting the driving force.

The sensors 80 includes a vehicle speed sensor, a gyro sensor, a shift position sensor and the like. The sensors 80 each output a detection signal detected by each sensor 80 to the main control unit 214.

The automatic parking switch 90 is used for a occupant to automatically park the vehicle 10. For example, the automatic parking switch 90 is disposed in the vicinity of the center of the instrument panel. The main control unit 214 executes an automatic parking process of the vehicle 10 in response to the parking switch 90 when being operated. The automatic parking switch 90 may be displayed on the display unit 41 when the display unit 41 is constituted of a touch panel.

The configuration of the parking assist apparatus 1 according to the present embodiment is described so far. Next, an automatic parking process executed by the main control unit 214 will be described. In the following, the above-described vehicle 10 is described as an own vehicle 10. Hereinafter, an example in which the own vehicle 10 is double-parked will be described. However, for a case where the own vehicle 10 is parallel-parked, the contents of the processing by the main control unit 214 is similar to that of the doubled-parking. The doubled-parking refers to a parking mode in which the own vehicle 10 is parked such that a parked vehicle and the own vehicle 10 are arranged in a vehicle width direction of the own vehicle 10. The parallel parking refers to a parking mode in which the own vehicle is parked such that a parked vehicle and the own vehicle are arranged in the front-back direction of the own vehicle.

Firstly, movement of the own vehicle 10 when the automatic parking process is performed. Note that the automatic parking process is executed when the automatic parking switch 90 is operated as described above. Further, in the following, as shown in FIGS. 5A to 5C, an example will be described in which a parking space PS is present in the left side of the own vehicle 10 and parked vehicles 110 are parked on both sides of the parking space PS.

Figure 5A:
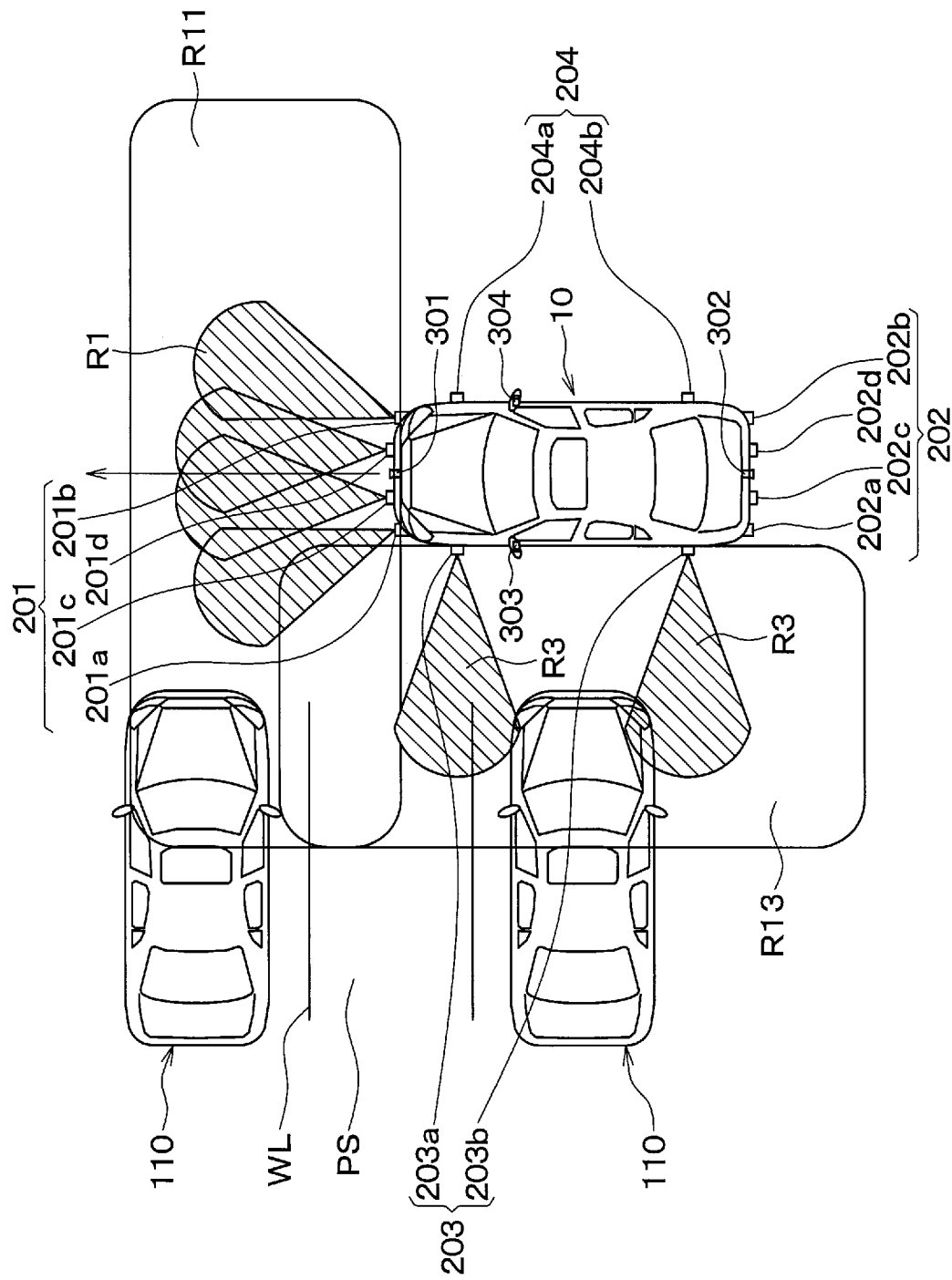
FIG. 5A is a schematic diagram showing a state of a vehicle when executing a parking space detecting process.
Figure 5B:
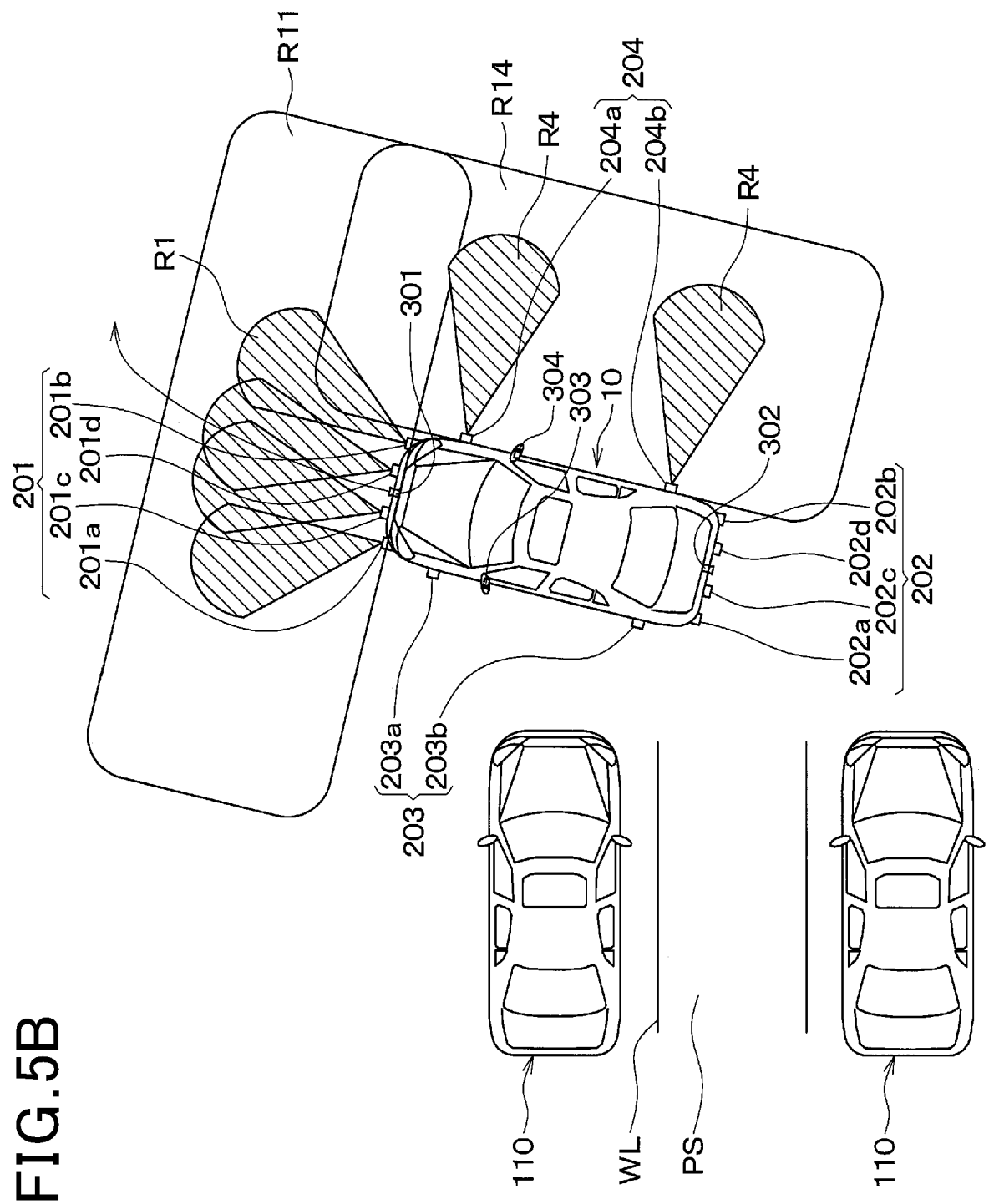
FIG. 5B is a schematic diagram showing a state of a vehicle when executing an angle adjusting process.
Figure 5C:
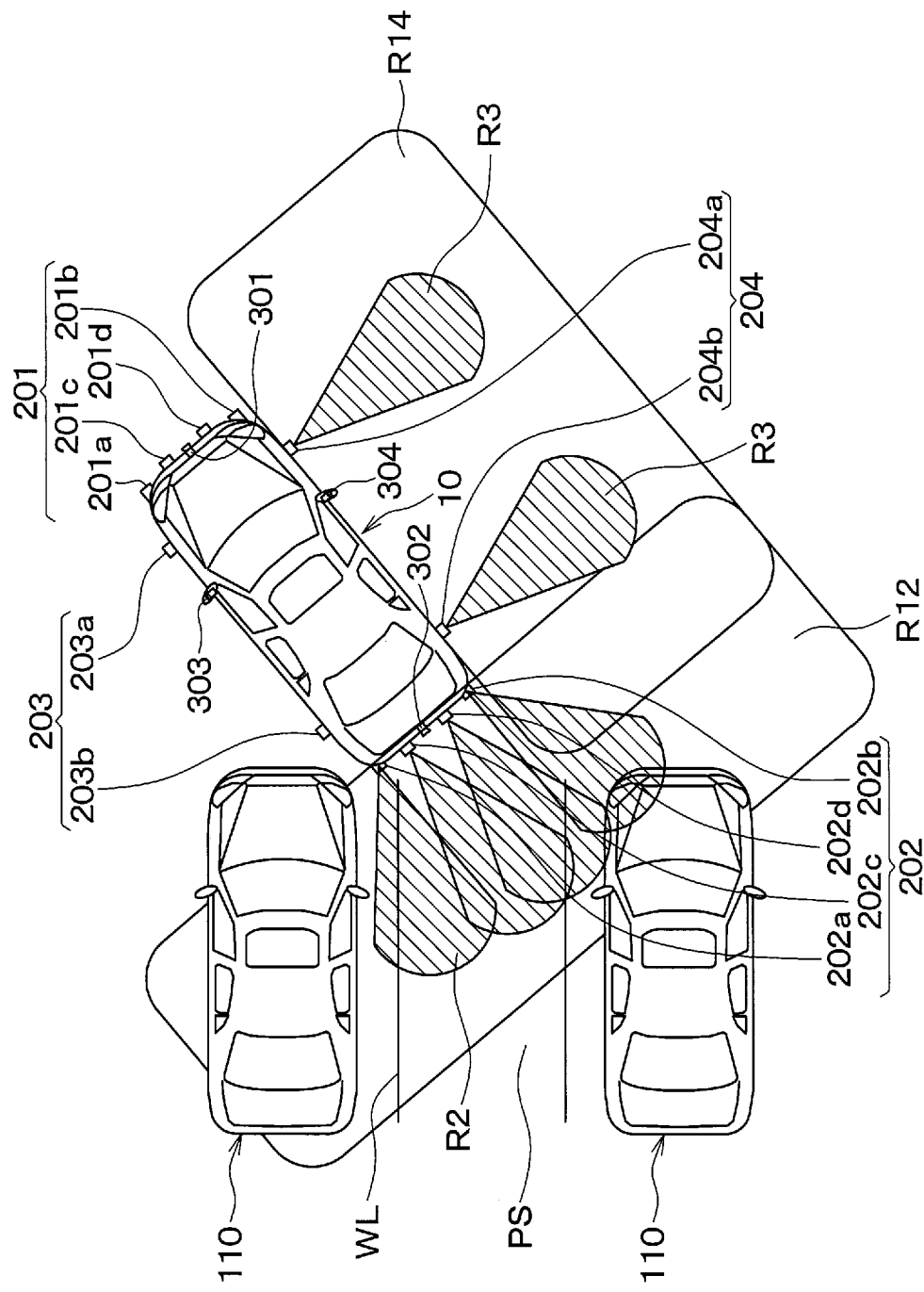
FIG. 5C is a schematic diagram showing a state of a vehicle when executing a parking process.

When the own vehicle 10 is parked by the automatic parking process, as shown in FIG. 5A, a parking space detecting process is executed for detecting the parking space PS. Next, in the case where the own vehicle 10 is parked by the automatic parking process, as shown in FIG. 5B, a process for adjusting the angle of the own vehicle (hereinafter simply referred to as an angle adjusting process) is executed so as to park the own vehicle 10 in the parking space 10. Thereafter, when the own vehicle 10 is parked by the automatic parking, as shown in FIG. 5C, a parking process for parking the own vehicle 10 in the parking space 10 is executed.

When executing the automatic parking process, as is known, the main control unit 214 outputs various control signals to the steering control unit 50, the power train unit 70 and the braking unit 60, thereby controlling the travelling direction of the own vehicle 10 and the travelling speed of the own vehicle 10. Then, the main control unit 214 extracts a route to the parking space PS when the parking space PS is detected, and controls the travelling of the own vehicle 10. The main control unit 214 controls the display unit 41 to display a corresponding image when executing the parking space detecting process.

Next, the sonars 201 to 204 that acquire the detection signals used for the automatic parking process, the cameras 301 to 303 that acquire image signals, and the processes of the main control unit 214 will be described.

In the parking space detecting process, as shown in FIG. 5A, the main control unit 214 detects the parking space PS in the left side of the vehicle 10 while making the vehicle 10 move forward. In this case, the main control unit 214 recognizes a state ahead of the vehicle 10 based on the detection signal of the F sonar 201 and the image signal of the F camera 301 and makes the vehicle 10 move forward. Also, the main control unit 214 recognizes a state of the left side of the vehicle 10 based on the detection signal of the LS sonar 203 and the image signal of the LS camera 303 to detect the parking space PS.

At this moment, as shown in FIG. 6A, in the case where the F sonar 201, the F camera 301, the LS sonar 203 and he LS camera 303 are in a normal state, the main control unit 214 executes a first parking space detecting process as a regular parking space detecting process.

Also, in the case where a fault has occurred in both of the F camera 201 and the F camera 301, since a state ahead of the vehicle cannot be recognized, the main control unit 214 does not execute the parking space detecting process. Similarly, in the case where a fault has occurred in both of the LS sonar 203 and the LS camera 303, since a state in the left side of the vehicle 10 cannot be recognized, the main control unit 214 does not execute the parking space detecting process. Note that a fault occurring on the LS sonar 203 refers to a state where a fault is occurring on the first LS sonar 203a and the second LS sonar 203b.

On the other hand, in the case where either the F sonar 201 or the F camera 301 has a fault and at least one of the LS sonar 203 and the LS camera 303 is in a normal state, the main control unit 214 executes a second parking space detecting process which is different from the first parking space detecting process. Further, in the case where at least one of the LS sonar 203 and the LS camera 303 has a fault and at least one of the F sonar 201 and the F camera 301 is in a normal state, the main control unit 214 executes the second parking space detecting process.

In this case, when a fault has occurred on the LS camera 303, the main control unit 214 detects the parking space PS by using only the detection signal of the LS sonar 203. However, when the main control unit 214 detects the parking space PS by using only the detection signal of the LS sonar 203, the main control unit 214 recognizes the parked vehicle 110 with the detection signal of the LS sonar 203 to detect the parking space PS. Accordingly, the main control unit 214 cannot complete the parking space detecting process when the parked vehicle 110 is not present. Hence, the main control unit 214 makes the display unit 41 display an image notifying that the parking space detecting process is unable to be completed when the parked vehicle 110 is not parked.

The main control unit 214 detects the parking space PS by using only the image signal of the LS camera when a fault has occurred on the LS sonar 203. However, in the case where the parking space PS is detected by using only the image signal of the LS camera 303, the main control unit 214 recognizes the white line WL based on the image signal of the LS camera 303 to detect the parking space PS. Hence, when the white line WL is not present, the main control unit 214 cannot complete the parking space detecting process.

Therefore, the main control unit 214 makes the display unit 41 display an image notifying that the parking space detecting process is unable to be completed when the white line WL is not present.

According to the present embodiment, the LS sonar 203 includes the first LS sonar 203a and the second sonar 203b, and the first LS sonar 203a and the second LS sonar 203b are mutually separated. Hence, the main control unit 214 determines that a fault has occurred on a part of the LS sonar 203 when a fault has occurred on either the first LS sonar 203a or the second sonar 203b, and executes a second parking space detecting process. In this case, the main control unit 214 executes, when the LS camera 303 is in the normal state, the second parking space detecting process using whichever of the detection signal of the LS sonar or the image signal of the LS camera 303 is in the normal state. Further, in the case where a fault has occurred on the LS camera 303, the main control unit 214 executes the second parking space detecting process by using only the detection signal of the LS sonar which is in the normal state. That is, when a fault has occurred on the LS camera 303, the main control unit 214 executes a parking space detecting process which is unable to be completed when the parked vehicle 110 is not parked.

According to the present embodiment, the F sonar 201 is configured of the first to fourth F sonars 201a to 201d which are integrated. Hence, the main control unit 214 determines that the F sonar 201 has a fault as a whole even if at least one of the first to fourth F sonars 201a to 201d has a fault. Note that the second parking space detecting process is more restricted than the first parking space detecting process as described above.

In the next angle adjusting process, as shown in FIG. 5B, the main control unit 214 adjusts the angle of the own vehicle 10 with respect to the parking space PS to make the own vehicle 10 enter the detected parking space PS. In this case, according to an example shown in FIG. 5B, the own vehicle 10 is controlled to advance in the right-front direction, thereby adjusting the angle of the own vehicle 10. Hence, the main control unit 214 recognizes a state ahead of the vehicle 10 based on the detection signal of the F sonar 201 and the image signal of the F camera 301. Also, the main control unit 214 recognizes a state on the right side of the own vehicle 10 based on the detection signal of the RS sonar 204 and the image signal of the RS camera 304. Then, the main control unit 214 executes the angle adjusting process based on these recognition result.

At this moment, as shown in FIG. 6B, the main control unit 214 executes a first angle adjusting process as a regular angle adjusting process as a regular angle adjusting process.

The main control unit 214 does not execute the angle adjusting process in the case where both the F sonar 201 and the F camera 301 are in a fault state, because the state ahead of the vehicle 10 cannot be recognized. Similarly, in the case where both the RS sonar 204 and the RS camera 304 are in a fault state, since the state of the right side of the vehicle 10 cannot be recognized, the main control unit 214 does not execute the angle adjusting unit. Note that a fault of the RS sonar 204 refers to a state where the first RS sonar 204a and the second RS sonar 204b are in a fault state.

On the other hand, in the case where a fault has occurred in either the F sonar 201 or the F camera 301 and at least one of the RS sonar 204 and the RS camera 304 is in the normal state, the main control unit 214 executes the second angle adjusting process different from the first angle adjusting process. Similarly, in the case where a fault has occurred in either the RS sonar 204 or the RS camera 304 and at least one of the F sonar 201 and the F camera 301 is in the normal state, the main control unit 214 executes the second angle adjusting process. In other words, the main control unit 214 executes the second angle adjusting process even when a fault has occurred on at least one of the F camera 301, the RS sonar 204 and the RS camera 304, as long as a state ahead of the vehicle 10 and a state of the right side of the vehicle 10 can be recognized. Then, the main control unit 214 controls, when executing the second angle adjusting process, the display unit 41 to display an image indicating the second angle adjusting process being performed.

Further, according to the present embodiment, the RS sonar 204 includes the first RS sonar 204a and the second RS sonar 204b, and the first RS sonar 204a and the second RS sonar 204b are mutually separated. Hence, in the case where either the first RS sonar 204a or the second RS sonar 204b has a fault, the main control unit 214 determines that a part of the RS sonar 204 has a fault, and executes the second angle adjusting process. In this case, when the RS camera 304 is in normal state, the main control unit 214 executes the second angle adjusting process using the detection signal of the RS sonar in normal state and the image signal of the RS camera 304. Also, the main control unit 214, when the RS camera 304 has a fault, executes the second angle adjusting process using only the detection signal of the RS sonar in normal state. Note that the second angle adjusting process is more restricted than the first angle adjusting process as described above.

In the subsequent parking process, as shown in FIG. 5C, the main control unit 214 makes the own vehicle 10 park in the parking space PS. In this case, according to an example shown in FIG. 5C, the own vehicle 10 is controlled to advance in the left-rear direction, thereby making the own vehicle 10 park in the parking space PS. Hence, the main control unit 214 recognizes a state in the rear side of the vehicle 10 based on the detection signal of the R sonar 202 and the image signal of the R camera 302. Further, the main control unit 214 recognizes a state in the right side of the vehicle 10 based on the detection signal of the RS sonar 204 and the image signal of the RS camera 304. Then, the main control unit 214 makes the own vehicle park in the parking space PS based on these recognition results.

At this moment, as shown in FIG. 6C, in the case where the R sonar 202, the R camera 302, the RS sonar 204, the RS camera 304 are in a normal state, the main control unit 214 executes the first parking process as a regular parking process.

In the case where both the R sonar 202 and the R camera 302 are in a fault state, since the state in the rear side of the vehicle 10 cannot be recognized, the main control unit 214 does not execute the parking process. Similarly, in the case where both the RS sonar 204 and the RS camera 304 are in a fault state, since the state on the right side of the vehicle 10 cannot be recognized, the main control unit 214 does not execute the parking process. Note that the fault of the RS sonar 204 refers to a state where a fault is occurring on the first RS sonar 204a and the second RS sonar 204b.

On the other hand, in the case where either the R sonar 202 or the R camera 302 has a fault and at least one of the RS sonar 204 and the RS camera 304 is in a normal state, the main control unit 214 executes a second parking process which is different from the first parking process. Similarly, in the case where either the RS sonar 204 or the RS camera 304 has a fault and at least one of the F sonar 201 and the F camera 301 is in a normal state, the main control unit 214 executes the second parking process. In other words, the main control unit 214 executes the second parking process even when a fault has occurred on at least one of the R sonar 202, the R camera 302, the RS sonar 204 and the RS camera 304, as long as a state of the rear side of the vehicle 10 and a state of the right side of the vehicle 10 can be recognized. Then, the main control unit 214 controls, when executing the second parking process, the display unit 41 to display an image indicating that the second parking process is being performed.

Further, similar to the above-described angle adjusting process, in the case where either the first RS sonar 204a or the second RS sonar 204b is in normal state, the main control unit 214 determines that a part of the RS sonar 204 is in fault state and executes the second parking process. In this case, when the RS camera 304 is in normal state, the main control unit 214 executes the second parking process using the detection signal of the RS sonar in normal state and the image signal of the RS camera 304. Also, the main control unit 214, when the RS camera 304 has a fault, executes the second parking process using only the detection signal of the RS sonar in normal state.

However, according to the present embodiment, the R sonar 202 includes the first to fourth sonars 202a to 202d which are integrated. Hence, the main control unit 214 determines that the R sonar 202 has a fault as a whole even if at least one of the first to fourth R sonars 202a to 202d has a fault. Note that the second parking process is more restricted than the first parking process as described above.

Further, according to the present embodiment, the main control unit 214 executes an emergency braking control process (i.e. automatic braking control process) for urgently stopping the vehicle automatically, when an obstacle is detected in the automatic parking process. That is, the main control unit 214 is configured to enable executing the emergency braking operation. For example, the main control unit 214 executes the emergency braking control process in the case where an obstacle is detected in the angle adjusting process and determines that the vehicle 10 may contact with the obstacle. Then, the main control unit 214 notifies the display 41 that the vehicle 10 is stopped by executing the emergency braking control. In this case, according to the present embodiment, the main control unit 214 restarts processes which have been stopped, when the occupant re-operates the automatic parking switch 90 after the emergency braking control operation has been executed.

Subsequently, with reference to FIGS. 7 to 10, detailed contents of the automatic parking process executed by the main control unit 214 will be described. The main control unit 214 executes the following process when the automatic parking switch 90 is operated. Further, as described above, the main control unit outputs various control signals to the steering unit 50, the power train unit 70 and the braking unit 60 or the like to control them, thereby executing the automatic parking process. Moreover, the main control unit 214 executes the emergency braking control process to stop the automatic parking process, when an obstacle is detected during operation of the automatic parking process. In this case, for example, the automatic parking switch 90 is re-operated, whereby the main control unit 214 re-starts the processes which have been stopped. According to the present embodiment, an operation (e.g. accelerator pedal operation) of the power train control unit 70 by the occupant is invalidated, but an operation of the braking unit 60 (e.g. braking pedal operation) is valid.

Figure 7:
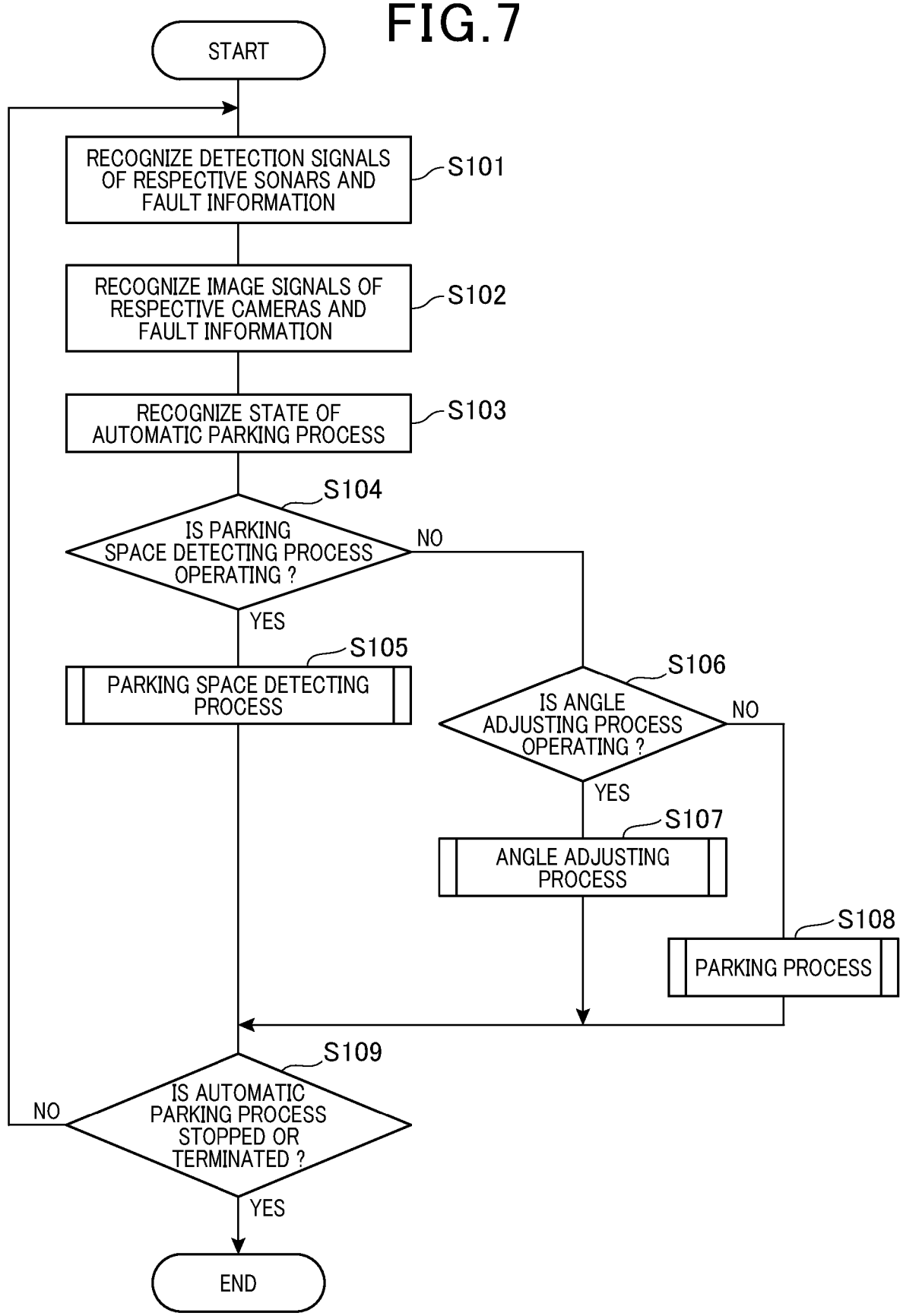
FIG. 7 is a flowchart showing an automatic parking process executed by a main control unit.

Firstly, as shown in FIG. 7, the main control unit 214 recognizes, at step S101, detection signals detected by respective sonars 201 to 204, and fault information of the respective sonars 201 to 204. Note that the fault information of the respective sonars 201 to 204 is transmitted from the sonar control unit 213 when performing the fault determination of the respective sonars 201 to 204 as described above.

Next, the main control unit 214 recognizes, at step S102, image signals captured by images by the respective cameras 301 to 304, and fault information of the cameras 301 to 304. Note that the fault information for the respective cameras 301 to 304 is transmitted from the camera control unit 313 when performing the fault determination for the respective cameras 301 to 304.

Subsequently, the main control unit 214 recognizes, at step S103, the state of the automatic parking process. In other words, the main control unit 214 determines which process among the parking space detecting process, the angle adjusting process, and the parking process is required to be executed. This determination is accomplished by, for example, storing appropriate contents of processes into RAM or the like when executing each process and reading the stored information. For the determination in this step, similar determination is applied when starting the respective processes in addition to a case where the respective processes are executing. For example, when determining that the main control unit 214 is performing parking space detection, the determination includes a case when the parking space detecting process is started in addition to a case when the parking space detecting process is executing.

The main control unit 214 determines, at step S104, whether the parking space detecting process is executing. Then, the main control unit 214 executes, when determined that parking space detection is being performed (i.e. step S104: YES), the parking space detecting process at step S105. On the other hand, the main control unit 214 determines, when determined that the parking space detecting is not being performed, whether the angle adjusting process is being performed at step S106.

The main control unit 214 executes, when determined that the angle adjusting is being performed (i.e. step S106: YES), the angle adjusting process at step S107. On the other hand, the main control unit 214 executes, when determined that the angle adjusting process is not being performed (i.e. step S106: NO), the parking process at step S108.

Figure 8:
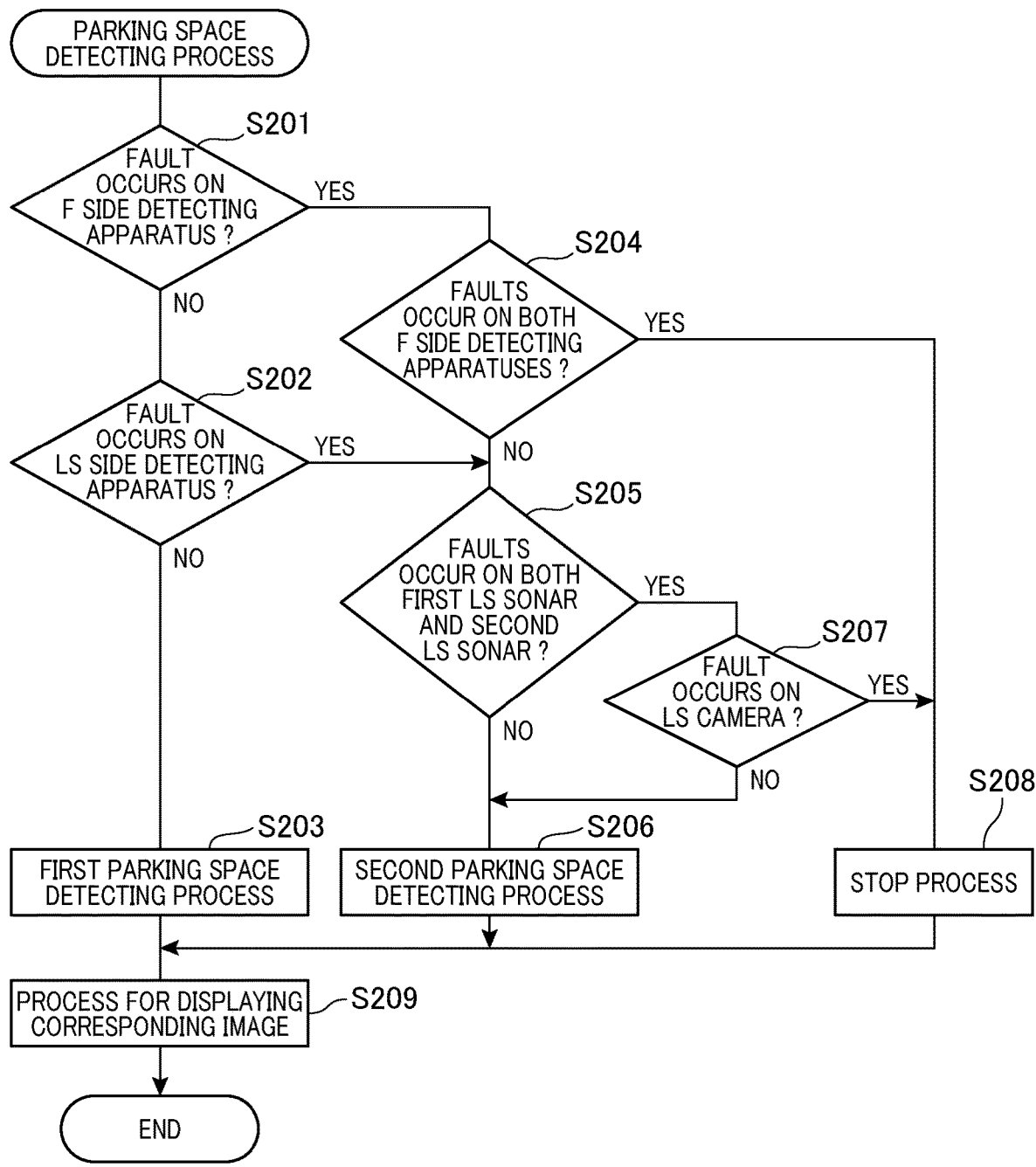
FIG. 8 is a flowchart showing a parking space detecting process executed by a main control unit.
Figure 9:
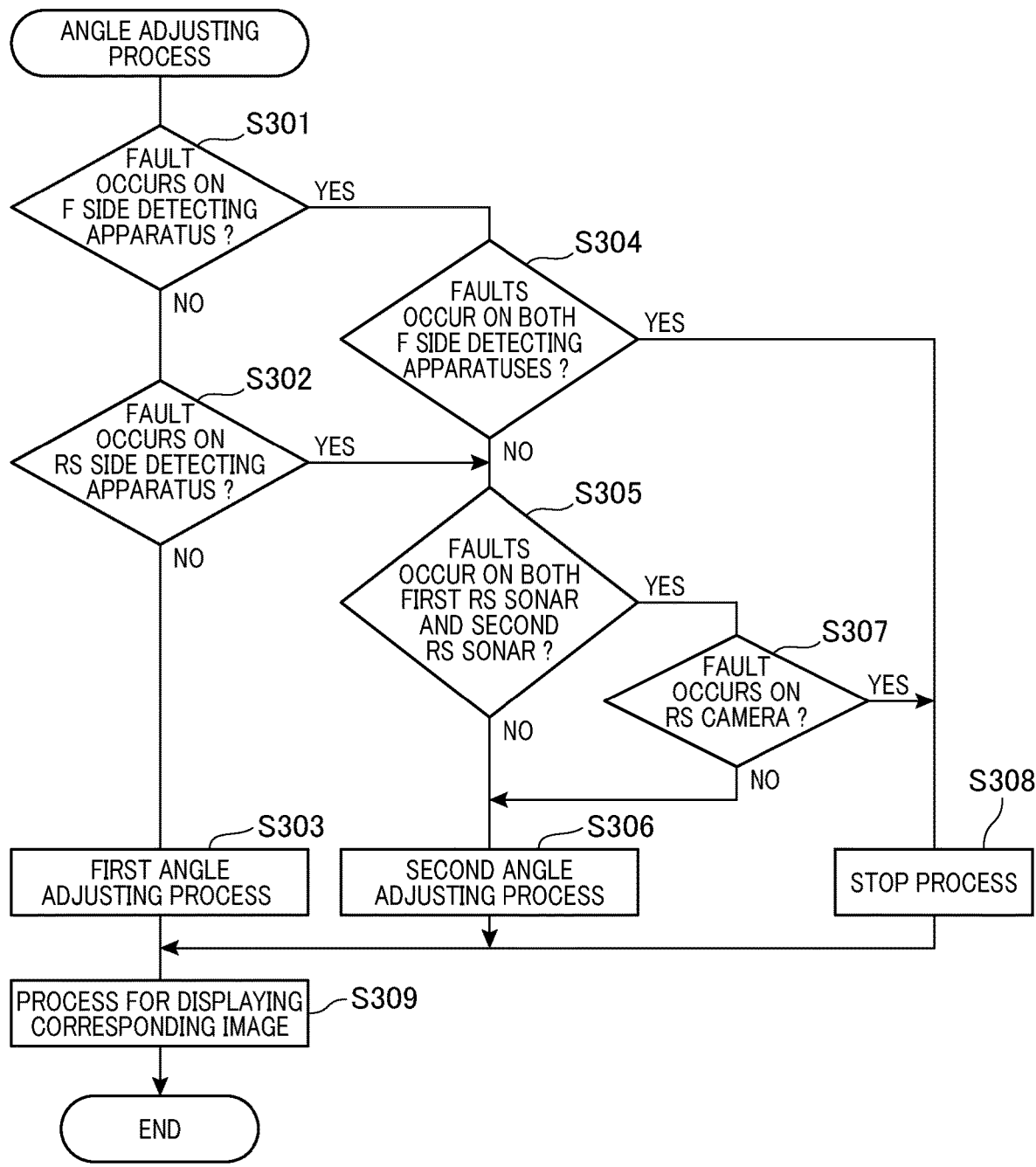
FIG. 9 is a flowchart showing an angle adjusting process executed by a main control unit.
Figure 10:
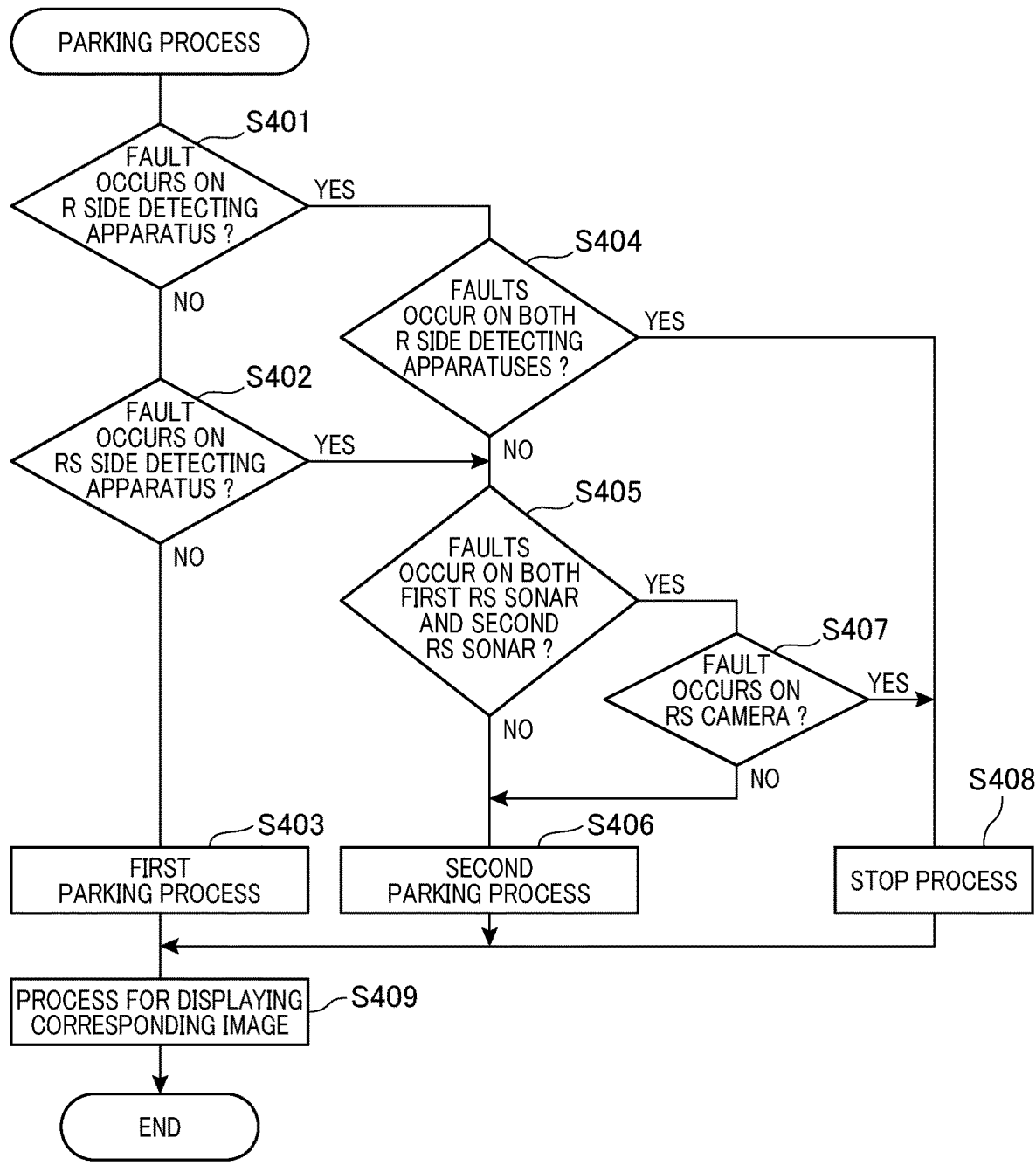
FIG. 10 is a flowchart showing a parking process executed by a main control unit.

Here, with reference to FIGS. 8 to 10, the parking space detecting process of step S105, the angle adjusting process of step S107, and the parking process of step S108 will be described in this order. Note that a detection apparatus in F side shown in FIGS. 8 and 9 is expressed, including the F sonar 201 and the F camera 301. Similarly, a detection apparatus on R side shown in FIG. 10 includes the R sonar 202 and the R camera 302. A detection apparatus in LS side shown in FIG. 8 includes the LS sonar 203 and the LS camera 303. A detection apparatus in RS side shown in FIG. 10 is expressed, including the RS sonar 204 and the RS camera 304.

Firstly, the parking space detecting process will be described with reference to FIG. 8. In the parking space detecting process, as described above, information about the F sonar 201, the LS sonar 203, the F camera 301 and the LS camera 303 is used to detect the parking space PS.

Hence, the main control unit 214 determines whether a fault has occurred on the detection apparatus in the F side. In other words, the main control unit 214 determines whether a fault has occurred on at least one of the F sonar 201 and the F camera 301. Then, the main control unit 214 determines, when determined that no fault has occurred in the detection apparatus in the F side (i.e. step S201: NO), whether a fault has occurred on the detection apparatus in the LS side at step S202. That is, the main control unit 214 determines whether a fault has occurred on either the LS sonar 203 or the LS camera 303.

The main control unit 214 executes, when determined that no fault has occurred on the detection apparatus in the LS side (i.e. step S202: NO), the first space detecting process at step S203. That is, the main control unit 214 executes, when determined that all of the F sonar 201, the LS sonar 203, the F camera 301 and the LS camera 303 are in the normal state, the first parking space detecting process.

In the determination for the LS sonar 203 at step S202, the main control unit 214 determines that no fault has occurred in the case where both of the first LS sonar 203a and the second LS sonar 203b are in a normal state. In other words, in the determination for the LS sonar 203 at step S202, the main control unit 214 determines that a fault has occurred on the LS sonar 203 when either the first LS sonar 203a or the second LS sonar 203b is in a fault state.

The main control unit 214 determines, when determined that a fault has occurred on the F side detection apparatus at step S201 (i.e. step S201: YES), whether faults have occurred on both of the detection apparatuses in F side at step S204. That is, the main control unit 214 determines whether faults have occurred on both the F sonar 201 and the F camera 301. The main control unit 214 determines, when determined that no faults have occurred on both of the F side detection apparatuses (i.e. step S204: NO), whether faults have occurred on both the first LS sonar 203a and the second LS sonar 203b at step S205.

The main control unit 214 executes, when determined that no faults have occurred on the first LS sonar 203a and the second LS sonar 203b (i.e. S205: NO), the second parking space detecting process at step S206. In other words, the main control unit 214 executes, when determined that either the first LS sonar 203a and the second LS sonar 203b is in normal state, the second parking space detecting process.

The main control unit 214 determines, when determined that faults have occurred on both the first LS sonar 203a and the second LS sonar 203b (i.e. S205: YES), whether a fault has occurred on the LS camera 303 at step S207. The main control unit 214 executes, when determined that no fault has occurred on the LS camera 303 at step S207 (i.e. step S207: NO), the second parking space detecting process at step S206. Further, the main control unit 214 executes processes subsequent to the step S205, when determined that a fault has occurred on the LS side detecting apparatus at step S202 (i.e. S202: YES).

According to the second parking space detecting process at step S206, fault states of the F sonar 201, the LS sonar 203, the F camera 301, and the LS camera 303 are identified, and processes in accordance with the fault state are executed. Specifically, the process at step S206 is executed in the case where a fault has occurred on at least one of the F sonar 201, the LS sonar 203, the F camera 301 and the LS camera 303, and the front side and the left side of the vehicle is capable of being recognized. Hence, the main control unit 214 executes a parking space detecting process using information of the detecting apparatus having no faults.

In the second parking space detecting process, as described with reference to FIG. 6A, in the case where the first and second LS sonars 203a and 203b are in fault states and the LS camera 303 is in the normal state, if no white line WL is present, the parking space PS is unable to be detected. Moreover, in the case where the LS camera 303 is in a fault state and the first and second LS sonars 203a and 203b are in the normal states, if no parked vehicle 110 is present, the parking space PS is unable to be detected. In the case where either the first LS sonar 203a or the second LS sonar 203b is in fault state and the LS camera 303 is in the normal state, the parking space detecting process is performed using the sonar which is in the normal state and the LS camera 303.

Then, the main control unit 214 extracts a route to the parking space PS when the parking space PS is detected by executing the first parking space detecting process or the second parking space detecting process as described above. Thereafter, in the angle adjusting process and the parking process which will be described later, the main control unit 214 makes the vehicle 10 travel on the extracted route.

Also, when determined that both of the detecting apparatuses in the F side are in fault states at step S204 (i.e. step S204: YES), the main control unit 214 is unable to recognize the state ahead of the own vehicle 10. Similarly, when determined that the LS camera 303 is in a fault state at step S207 (i.e. step S207: YES), the left side of the own vehicle 10 cannot be recognized. Hence, in these cases, the main control unit 214 stops the parking space detecting process at step S208.

Then, the main control unit 214 controls, at step S209, the display unit 41 to execute a process for displaying a corresponding image, after executing the processes of steps S203, S206 and S208. For example, in the case where the first parking space detecting process is performed at step S203, the main control unit 214 controls the display unit 41 to display an image notifying that the parking space detection process is executing normally.

Further, in the case where the second parking space detecting process is to be executed at step S206, the main control unit 214 controls the display unit 41 to display an image notifying the occupant of a detecting apparatus in a fault state and an execution of the second parking space detecting process. In this case, when the LS sonar 203 is in a fault state, the main control unit 214 notifies the occupant that the parking space detection process will not be completed if no white line WL is present. Also, when the LS camera 303 is in a fault state, the main control unit 214 also notifies the occupant that the parking space detection process will not be completed if no parked vehicle 110 is present. Further, in the case where either the first LS sonar 203a or the second LS sonar 203b is in fault state, the main control unit 214 controls the display unit 41 to display an image notifying the occupant that the detecting apparatus is in a fault state. In the case where the parking space detecting process is terminated at step S208, the main control unit 214 controls the display unit 41 to display an image notifying the occupant that the detection apparatus is in a fault state and that the parking space detecting process is unable to be executed. Thus, the occupant is able to recognize the state of the parking space detecting process.

The parking space detecting process according to the present embodiment has been described in the above. In the parking space detecting process, step S203, step S206 and step S208 each corresponds to fault handling process. For step S203, since the first parking space detecting process is executed even when the R sonar 202 or the like is in a fault state, the process at step S203 is included in the fault handling process corresponding to an apparatus in a fault state.

Next, with reference to FIG. 9, an angle adjusting process will be described. In the angle adjusting process, as described above, information of the F sonar 201, the RS sonar 204, the F camera 301 and the RS camera 304 is utilized to adjust the angle of the vehicle 10 with respect to the parking space PS.

Hence, the main control unit 214 determines, similar to the process at step S201, whether a fault has occurred on the F side detecting apparatus at step S301. Then, when determined that no fault has occurred on the F side detecting apparatus (i.e. step S301: NO), the main control unit 214 determines whether a fault has occurred on the RS side detecting apparatus at step S302. In other words, the main control unit 214 determines whether a fault has occurred on at least one of the RS sonar 204 and the RS camera 304.

Then, the main control unit 214 executes, when determined that no fault has occurred on the RS side detecting apparatus (i.e. step S302: NO), the first angle adjusting process at step S303. That is, the main control unit 214 executes the angle adjusting process based on the detection signals of the F sonar 201 and the RS sonar 204, and the image signals of the F camera 301 and the RS camera 304.

In the determination for the RS sonar 204 at step S302, when both the first RS sonar 204a and the second RS sonar 204b are in normal state, the main control unit 214 determines that no faults have occurred on the RS sonar 204. In other words, the main control unit 214 determines that, when a fault has occurred on either the first RS sonar 204a or the second RS sonar 204b, the RS sonar is in a fault state.

The main control unit 214 determines, when determined that a fault has occurred on the F side detecting apparatus at step S301 (i.e. step S301: YES), whether a fault has occurred on both of the F side detecting apparatuses at step S304 similar to that of step S204. Then, the main control unit 214 determines, when determined that no fault has occurred on both of the F side detecting apparatuses (i.e. step S304: NO), whether faults have occurred on both the first RS sonar 204a and the second RS sonar 204b at step S305.

The main control unit 214 executes, when determined that no faults have occurred on both of the first RS sonar 204a and the second RS sonar 204b (i.e. S305: NO), the second angle adjusting process at step S306. In other words, the main control unit 214 executes, when determined that either the first RS sonar 204a or the second RS sonar 204b is in a normal state, the second angle adjusting process.

The main control unit 214 determines, when determined that faults have occurred on both of the first RS sonar 204a and the second RS sonar 204b (i.e. S305: YES), whether a fault has occurred on the RS camera 304 at step S307. The main control unit 214 executes, when determined that no fault has occurred on the RS camera 304 at step S307 (i.e. step S307: NO), the second angle adjusting process at step S306. Further, the main control unit 214 executes processes subsequent to the step S305, when determined that a fault has occurred on the RS side detecting apparatus at step S302 (i.e. S302: YES).

According to the second angle adjusting process at step S306, fault states of the F sonar 201, the RS sonar 204, the F camera 301, and the RS camera 304 are identified, and processes in accordance with the fault state are executed. Specifically, the process at step S306 is executed in the case where a fault has occurred on at least one of the F sonar 201, the RS sonar 204, the F camera 301 and the RS camera 304, and the front side and the right side of the vehicle 10 is capable of being recognized. Hence, the main control unit 214 executes the angle adjusting process using information from the detecting apparatus having no faults.

Further, the main control unit 214 is unable to recognize the state ahead of the own vehicle 10, when determined that faults have occurred on both of the F side detecting apparatuses at step S304 (i.e. step S304: YES). Similarly, the main control unit 214 is unable to recognize the state of the right side of the own vehicle 10, when determined that a fault has occurred on the RS camera 304 (i.e. step S307: YES). Hence, in these cases, the main control unit 214 stops the angle adjusting process at step S308.

Then, the main control unit 214 controls, at step S309, the display unit 41 to execute a process for displaying the corresponding image, after executing the processes of steps S303, S306 and S308. For example, in the case where the first angle adjusting process is performed at step S303, the main control unit 214 controls the display unit 41 to display an image notifying that the angle adjusting process is executing normally.

Further, in the case where the second angle adjusting process is to be executed at step S306, the main control unit 214 controls the display unit 41 to display an image notifying the occupant that a detecting apparatus is in a fault state and that the second angle adjusting process will be executed.

In the case where the angle adjusting process is terminated at step S308, the main control unit 214 controls the display unit 41 to display an image notifying the occupant of the detection apparatus in a fault state and that the angle adjusting process is unable to be executed.

The angle adjusting process according to the present embodiment have been described in the above. In the adjusting process, step S303, step S306 and step S308 each correspond to fault handling process. For step S303, since the first angle adjusting process is executed even when the R sonar 202 or the like is in a fault state, the process at step S303 is included in the fault handling process corresponding to an apparatus in a fault state.

Next, with reference to FIG. 10, a parking process will be described. In the parking process, as described above, the vehicle 10 is parked in the parking space PS using information of the R sonar 202, the RS sonar 204, the R camera 302 and the RS camera 304.

Hence, the main control unit 214 determines whether a fault has occurred on the R side detecting apparatus at step S401. In other words, the main control unit 214 determines whether a fault has occurred on either the R sonar 202 or the R camera 303. Then, the main control unit 214 determines, when determined that no fault has occurred on the R side detecting apparatus (i.e. step S401: NO), whether a fault has occurred on the RS side detecting apparatus at step S402 similar to that of step S302. The main control unit 214 executes, when determined that no fault has occurred on the RS side detecting apparatus (i.e. step S402: NO), the first parking process at step S403. Specifically, the main control unit 214 executes the parking process based on the detection signals of the R sonar 202, the RS sonar 204, and the image signals of the R camera 302 and the RS camera 304.

In the determination for the RS sonar 204 at step S402, when both the first RS sonar 204a and the second RS sonar 204b are in normal state similar to that of the step S302, the main control unit 214 determines that no faults occurred on the RS sonar 204.

The main control unit 214 determines, when determined that a fault has occurred on the R side detection apparatus at step S401 (i.e. step S401:YES), whether faults have occurred on both of the detection apparatuses in R side at step S404. The main control unit 214 determines, when determined that no faults have occurred on both of the R side detection apparatuses (i.e. step S404: NO), whether faults have occurred on both the first RS sonar 204a and the second RS sonar 204b at step S405.

The main control unit 214 executes, when determined that no faults have occurred on both of the first RS sonar 204a and the second RS sonar 204b (i.e. step S405: NO), the second parking process at step S406. In other words, the main control unit 214 executes the second parking process when determined that either the first RS sonar 204a or the second RS sonar 204b is in the normal state.

The main control unit 214 determines, when determined that faults have occurred on the first RS sonar 204a and the second RS sonar 204b (i.e. S405: YES), whether a fault has occurred on the RS camera 304 at step S407. The main control unit 214 executes, when determined that no fault has occurred on the RS camera 304 at step S407 (i.e. step S407: NO), the second parking process at step S406. Also, the main control unit 214 executes processes subsequent to the step S405, when determined that a fault has occurred on the RS side detecting apparatus (i.e. S402: YES).

According to the second parking space detecting process at step S406, fault states of the R sonar 202, the RS sonar 204, the R camera 302, and the RS camera 304 are identified, and processes in accordance with the fault states are executed. Specifically, the process at step S406 is executed in the case where a fault has occurred on at least one of the R sonar 202, the RS sonar 204, the R camera 302 and the RS camera 304, and the front side and the left side of the vehicle is capable of being recognized. Hence, the main control unit 214 executes a parking space detecting process using information from the detecting apparatus having no faults.

Further, the main control unit 214 is unable to recognize the state in the rear side of the own vehicle 10, when determined that faults have occurred on both of the R side detecting apparatuses at step S407 (i.e. step S407: YES). Similarly, the main control unit 214 is unable to recognize the state in the right side of the own vehicle 10, when determined that a fault has occurred on the RS camera 304 (i.e. step S407: YES). Hence, in these cases, the main control unit 214 stops the parking process at step S408.

Then, the main control unit 214 controls, at step S409, the display unit 41 to execute a process for displaying the corresponding image, after executing the processes of steps S403, S406 and S408. For example, in the case where the first parking process is performed at step S403, the main control unit 214 controls the display unit 41 to display an image notifying that the parking process is executing normally.

Further, in the case where the second parking process is to be executed at step S406, the main control unit 214 controls the display unit 41 to display an image notifying the occupant of a detecting apparatus in a fault state and that the second parking process will be executed.

In the case where the parking process is terminated at step S408, the main control unit 214 controls the display unit 41 to display an image notifying the occupant of the detection apparatus in a fault state and that the parking process is unable to be executed.

The parking process according to the present embodiment have been described in the above. In the parking process, step S403, step S406 and step S408 each corresponds to fault handling process. For step S403, since the first parking process is executed even when the F sonar 201 or the like is in a fault state, the process at step S403 is included in the fault handling process corresponding to an apparatus in a fault state.

Returning to the explanation of the automatic parking process, as shown in FIG. 7, the main control unit 214 executes a determination process of step S109, after executing the parking process of step S108. The main control unit 214 determines whether a stop process is executed or an automatic parking process is executed at step S109. Then, the main control unit 214 repeatedly executes processes subsequent to step S101 when determined that the process is not stopped and the automatic parking process is not completed (i.e. step S109: NO). On the other hand, when determined that the process is stopped or the automatic parking process is completed (i.e. step S109: YES), the main control unit 214 terminates the automatic parking process.

As described, according to the present embodiment, when performing the automatic parking process, processes are executed in accordance with the fault states of the sonars 201 to 204, the cameras 301 to 304 which are used for respective processes. In other words, in an example shown in FIG. 5A where the parking space detecting process is executed, the main control unit 214 executes the parking space detecting process based the fault states of the F sonar 201 and the F camera 301, and the fault states of the LS sonar 203 and the LS camera 303. Also, in the example shown in FIG. 5B where the angle adjusting process is executed, the main control unit 214 executes the angle adjusting process based the fault states of the F sonar 201 and the F camera 301, and the fault states of the RS sonar 204 and the RS camera 304. In the example shown in FIG. 5C where the parking process is executed, the main control unit 214 executes the parking space detecting process based on the fault states of the R sonar 202 and the R camera 302, and the fault states of the RS sonar 204 and the RS camera 304.

Then, the main control unit 214 executes respective second processes or the stop process in the case where a detection apparatus that acquires required information for the respective processes is in a fault state. In other words, the main control unit 214 continues to execute respective processes even when a detection apparatus that acquires information is not required for the respective processes. Hence, for example, even though the F sonar 201 is in a fault state when executing the parking process, the main control unit 214 maintains execution of the parking process. Accordingly, the occupant is able to effectively utilize the automatic parking process.

Further, the main control unit 214 is configured to maintain execution of the respective processes even when a fault has occurred on some of the detecting apparatuses which acquire information required for respective processes. For example, when performing the parking space detecting process, even when either the F sonar 201 or the F camera 301 is in a faut state, the main control unit 214 executes the second parking space detecting process if at least one of the LS sonar 203 and the LS camera 303 is in a normal state. Thus, the occupant is able to effectively utilize the automatic parking process.

Moreover, according to the present embodiment, the LS sonar is composed of the first LS sonar 203a and the second LS sonar 203b which are disposed separately from each other. The main control unit 214 executes, even when either one of the first LS sonar 203a or the second LS sonar 203b is in a fault state, the respective second processes using the detection signals from the other sonar. Similarly, the main control unit 214 executes, even when either one of the first RS sonar 204a or the second RS sonar 204b is in a fault state, the respective second processes using the detection signals from the other sonar. Hence, the occupant is able to effectively utilize the automatic parking process.

Second Embodiment

Next, the second embodiment will be described. According to the present embodiment, the parking space detecting process and the angle adjusting process are modified from those in the first embodiment. Since other configurations are the same as those of the first embodiment, the explanation thereof is omitted.

Figure 11:
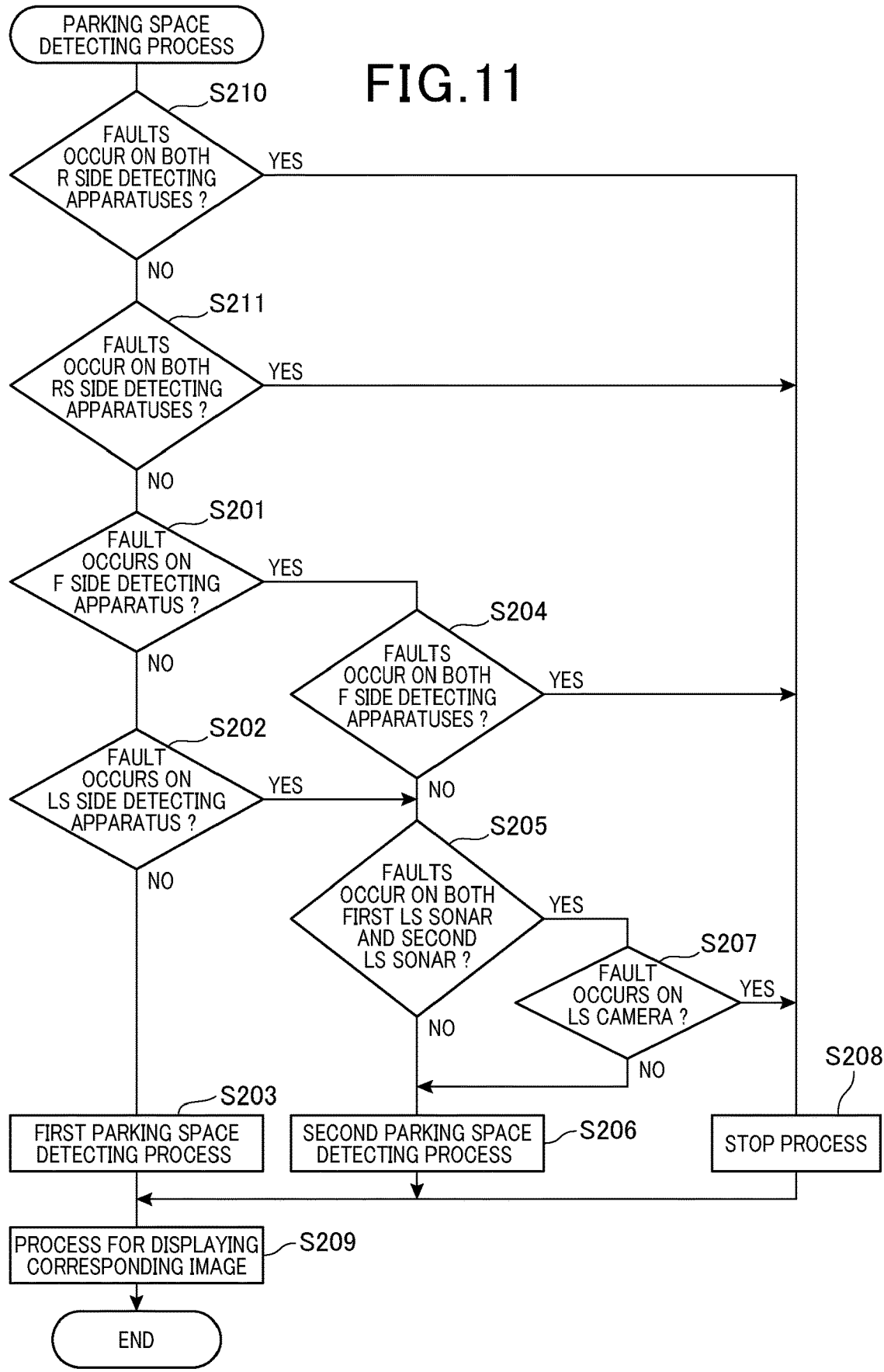
FIG. 11 is a flowchart showing a parking space detecting process executed by a main control unit according to a second embodiment.

Firstly, a parking space detecting process of the present embodiment will be described with reference to the FIG. 11.

In the parking space detecting process, the main control unit 214 determines, at step S214, whether faults have occurred on both of the R side detecting apparatuses used for the parking process. In other words, the main control unit 214 determines whether faults have occurred on both of the R sonar 202 and the R camera 302. Then, the main control unit 214 executes the process at step S211, when determined that no faults have occurred on both of the R side detecting apparatuses (i.e. step S210: NO). At step S211, the main control unit 214 determines whether faults have occurred on both of the RS side apparatuses used for the parking process and the angle adjusting process. In other words, the main control unit 214 determines whether faults have occurred on both of the RS sonar 204 and the RS camera 304. The main control unit 214 sequentially executes processes subsequent to step S201, when determined that no faults have occurred on both of the RS side detecting apparatuses (i.e. step S211: NO).

Note that the determination at step S210 where faults have occurred on both of the RS side detecting apparatuses refers to a case where the RS sonar 204 and the RS camera 304 are in fault states and the main control unit 214 is unable to recognize the state on the right side. Specifically, the fault of the RS sonar 204 refers to a case where the both of the first RS sonar 204a and the second RS sonar 204b are in fault states.

The main control unit 214 stops the parking space detecting process at step S208 when determined that faults have occurred on both of the R side detecting apparatuses (i.e. step S210: YES). Also, the main control unit 214 stops the parking space detecting process at step S208 when determined that faults have occurred on both of the RS side detecting apparatuses (i.e. step S211: YES).

In other words, according to the present embodiment, in the case where the parking space detecting process is performed and the stop process is executed in the subsequent angle adjusting process and the parking process, the parking space detecting process is stopped, thereby terminating the automatic parking process at step S109.

Figure 12:
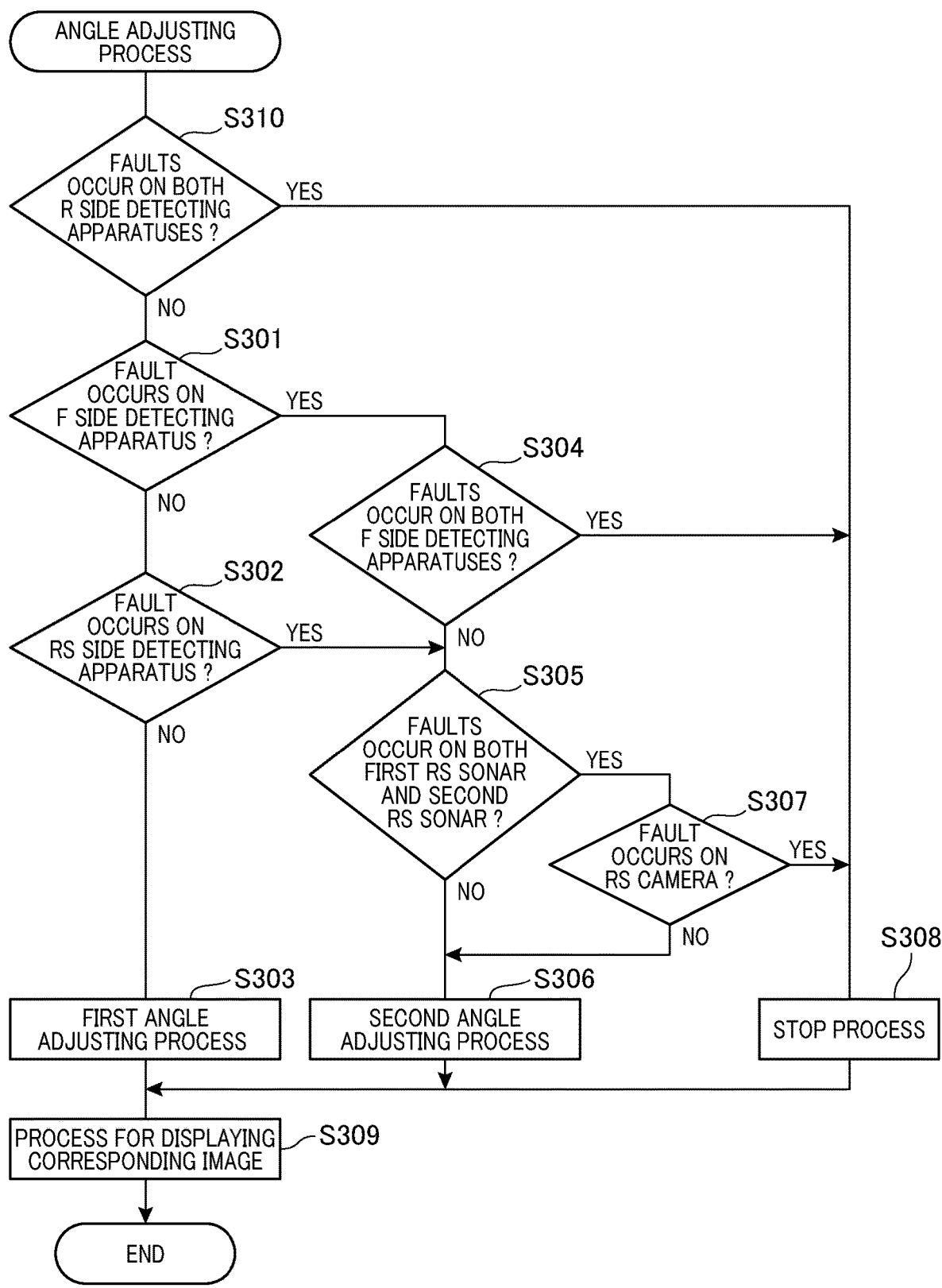
FIG. 12 is a flowchart showing an angle adjusting process executed by a main control unit according to the second embodiment.

Next, an angle adjusting process of the present disclosure will be described with reference to FIG. 12.

In the angle adjusting process, similar to step S210, the main control unit 214 determines, at step S310, whether faults have occurred on both of the R side detecting apparatuses used for the parking process. Then, the main control unit 214 sequentially executes processes subsequent to step S301, when determined that no faults have occurred on both of the R side detecting apparatuses (i.e. step S310: NO).

On the other hand, the main control unit 214 stops the angle adjusting process at step S308, when determined that a fault has occurred on the R side detecting apparatus at step S310 (i.e. step S310: YES).

In other words, similar to the above-described parking space detecting process, according to the angle adjusting process, in the case where the stop process is executed in the subsequent parking process, the angle adjusting process is stopped, thereby terminating the automatic parking process at step S109.

As described, according to the present embodiment, when performing the automatic parking process, in the case where the detection apparatus used for subsequent processes, the automatic parking process is stopped before executing the subsequent processes. Accordingly, the automatic parking process is prevented from being terminated during the middle of processing, and it is prevented from inconveniencing the occupants and causing discomfort to the occupants.

Other Embodiments

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

For example, in the above-described embodiments, the obstacle detecting unit 20 may be configured to include a ranging sensor for detecting an obstacle using the light, instead of using sonars 201 to 204. Moreover, the image acquiring unit 30 may be configured to include an image recognition sensor or the like instead of respective cameras 301 to 304.

Figure 13:
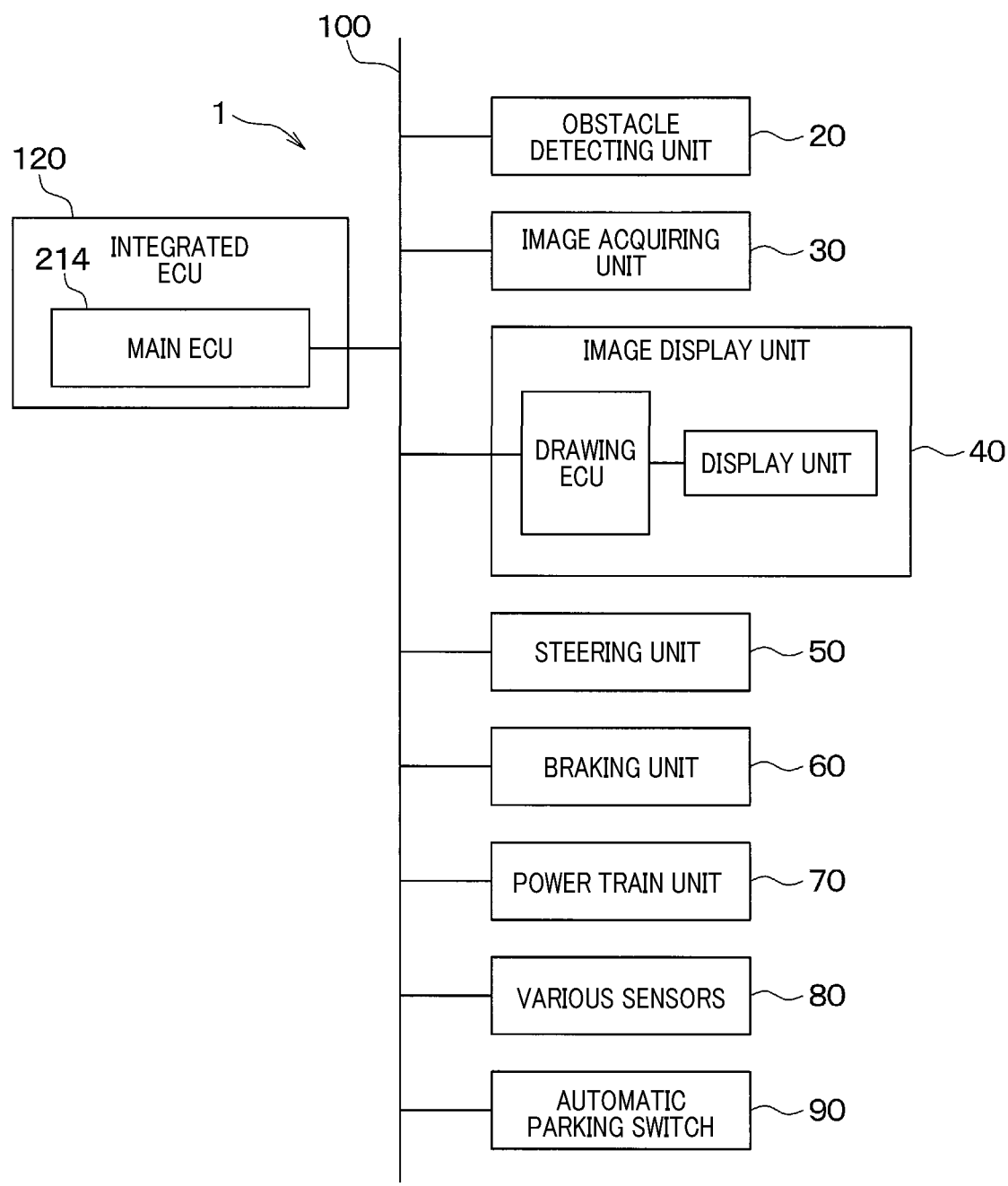
FIG. 13 is a block diagram showing a configuration of a parking assist apparatus according to other embodiments.

Also, in the above-described embodiments, the main control unit 214 may be integrated to the sonar control unit 213. The main control unit 214 may be provided in the camera ECU 310 not in the sonar ECU 210. Further, as shown in FIG. 13, the main control unit 214 may be provided separately from the sonar ECU 210 or the camera ECU 310 and may be disposed in an integrated ECU 120 that executes an overall control related to a traveling of the own vehicle 10.

Then, in the above-described embodiments, the fault determination of the sonars 201 to 204 and the cameras 301 to 304 may be performed by the main control unit 214.

Moreover, in the above-described embodiments, the angle adjusting process may be omitted in the automatic parking process depending on the position of the own vehicle 10 at a time when the parking space PS is detected. In other words, in the case where the parking process can be executed subsequent to completion of the parking space detecting process, the angle adjusting process may be omitted.

In the above-described embodiments, according to the parking space detecting process, the parking space detecting process may be executed based on the information in the predetermined period before starting the parking space detecting process. Then, when the parking space PS is detected based on the information before starting the process, the main control unit 214 may subsequently perform the angle adjusting process.

Further, in the above-described embodiments, the F sonar 201 may be configured such that the first to fourth F sonars 201a to 201d are not integrated but provided separately. In this case, a partial fault may occur in the F sonar 201. Similarly, the R sonar 202 may be configured such that the first to fourth R sonars 202a to 202d are not integrated but provided separately.

In the above-described embodiments, the LS sonar 203 may be configured such that the first LS sonar 203a and the second LS sonar 203b are integrated. In this case, it is determined that the LS sonar 203 is in a fault state as a whole even when a fault has occurred on either the first LS sonar 203a or the second LS sonar 203b. Similarly, the RS sonar 204 may be configured such that the first RS sonar 204a and the second RS sonar 204b are integrated.

Further, in the above-described embodiments, the number of sonars which constitute the F sonar 201 and the R sonar 202 is not limited to four, but may be appropriately changed. Similarly, the number of sonars which constitute the LS sonar 203 and the RS sonar 204 is not limited to two, but may be appropriately changed.

Furthermore, according to the above-described embodiments, specific contents of the respective second processes may be appropriately changed, such that the contents are changed depending on the type of vehicle where the parking assist apparatus 1 is mounted or the contents are selected by the occupant.

For example, in the case where the second parking space detecting process is executed at step S206, the main control unit 214 may determine that a subsequent parking space detecting process after completing the second parking space detecting process should not be executed. Similarly, in the case where the second angle adjusting process is executed at step S306, the main control unit 214 may determine that subsequent angle adjusting process after completing the second angle adjusting process should not be executed. Moreover, when executing the second parking process is executed at step S406, the main control unit 214 may determine that subsequent parking process after completing the second parking process should not be executed. In this case, the subsequent parking process as a whole may not be executed. In other words, for example, in the case where subsequent parking process is not executed in the parking process, the subsequent parking space detecting process and the angle adjusting process may not be executed.

Further, the main control unit 214 may be configured such that the emergency braking control process is disabled when executing the respective second processes. For example, when executing the second parking space detecting process, if a fault has occurred on either the F sonar 201 or the F camera 301, accuracy of recognizing a state ahead of the vehicle 10 is lowered compared to a case where the F sonar 201 or the F camera 301 are in the normal state. Hence, in such a case, the state ahead of the vehicle 10 may possibly be misrecognized. In this case, the emergency braking control is frequently operated in a state being misrecognized, thus causing the occupants to feel discomfort. Therefore, when executing the respective second processes, the main control unit 213 may not execute the emergency braking control process. However, the main control unit 214 may preferably control the display unit 41 to display that the emergency braking control should not be performed, thereby improving occupant's attentiveness.

Further, in the above-described embodiments, in the case where an accuracy difference is present between the sonar unit 200 and the camera unit 300, the respective first processes may be performed even when a fault has occurred on either one of the sonar unit 200 and the camera unit 300. For example, in the case where the accuracy of the F sonar 201 is higher than that of the F camera 301, and the LS sonar 203 and the LS camera 303 are in normal state, the parking space detecting process may be configured in accordance with the following manner. That is, the main control unit 214 executes the first parking space detecting process even when the F camera 301 is in a fault state but the F sonar 201 is in the normal state, and executes the second parking space detecting process in the case where the F sonar 201 is in a fault state and the F camera 301 is in the normal state.

Further, according to the above-described embodiments, a case is described in which two parked vehicles 110 are parked in the both side of the parking space PS. However, in the case where the LS sonar 203 detects the parking space PS, the main control unit 214 may be configured to detect, as long as a parked position of either one parked vehicle 110 is identified, the parking space PS with respect to the identified parked vehicle. In other words, the main control unit 214 may determine that the parking space PS is present when no obstacle is detected within a predetermined width range exceeding the width of the own vehicle 10 with respect to the identified parked vehicle 110.

The control unit and method thereof disclosed in the present disclosure may be accomplished by a dedicated computer constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes executed by the computer, in a computer readable non-transitory tangible recording media.

CONCLUSION

The present disclosure is to provide a parking assist apparatus in which the automatic parking process is readily and effectively utilized.

According to one aspect of the present disclosure, a parking assist apparatus mounted on a vehicle and configured to assist parking of the vehicle in a parking space includes: an obstacle detecting unit that acquires a detection signal based on a distance between the vehicle and an obstacle around the vehicle; an image acquiring unit that acquires an image signal corresponding to an image around the vehicle; and a control unit that executes, based on the detection signal and the image signal, an automatic parking process detecting the parking space and parking the vehicle in the parking space. The control unit is configured to execute, when executing the automatic parking process, a fault handling process depending on a state of the automatic parking process in the case where a fault occurs in either the obstacle detecting unit or the image acquiring unit.

According to this configuration, the control unit performs a fault handling process depending on states of the obstacle detecting unit, the image acquiring unit and the automatic parking process. Hence, the occupant can readily utilize the automatic parking function effectively.

According to another aspect of the present disclosure, the obstacle detecting unit includes a plurality of detecting units disposed at mutually different positions; the image acquiring unit includes a plurality of imaging units disposed at mutually different positions; and the control unit is configured to execute, when executing the automatic parking process, the fault handling process in the case where a fault occurs in either the obstacle detecting unit or the image acquiring unit, depending on a position of the obstacle detecting unit or the image detecting unit where the fault occurs and a state of the automatic parking process.

According to this configuration, the control unit executes the fault handling process depending on a position of the obstacle detecting unit or the image detecting unit where the fault occurs and a state of the automatic parking process. Hence, the control unit is able to maintain the automatic parking process as it is even when a fault has occurred on the obstacle detection unit or the image acquiring unit which are not used for the automatic parking process. Therefore, the occupant can readily utilize the automatic parking function more effectively.

What is claimed is:

1. A parking assist apparatus mounted on a vehicle and configured to assist parking of the vehicle in a parking space, the parking assist apparatus comprising:
    an obstacle detecting unit that acquires a detection signal based on a distance between the vehicle and an obstacle around the vehicle;
    an image acquiring unit that acquires an image signal corresponding to an image around the vehicle; and
    a control unit that executes, based on the detection signal and the image signal, an automatic parking process detecting the parking space and parking the vehicle in the parking space;
    a fault detecting means for detecting whether a fault occurs with the obstacle detecting unit or the image acquiring unit,
    wherein
    the control unit is configured to execute, when executing the automatic parking process, a fault handling process depending on a state of the automatic parking process in the case where the fault detecting means detects that a fault occurs on either the obstacle detecting unit or the image acquiring unit,
    the obstacle detecting unit includes a plurality of detecting units disposed at mutually different positions,
    the image acquiring unit includes a plurality of imaging units disposed at mutually different positions,
    the control unit is configured to determine whether to execute or stop the automatic parking process depending on a combination of respective states of the plurality of detecting units and the plurality of imaging units,
    the automatic parking process to be executed or stopped corresponding to the combination of the respective states of the plurality of detecting units and the plurality of imaging units, and
    the respective states of the plurality of detecting units and the plurality of imaging units comprising a normal state, a partial fault state and a fault state.

2. The parking assist apparatus according to claim 1, wherein
    the control unit is configured to execute, when executing the automatic parking process, the fault handling process in the case where a fault occurs on either the obstacle detecting unit or the image acquiring unit, depending on a position of the obstacle detecting unit or the image acquiring unit where the fault occurs and a state of the automatic parking process.

3. The parking assist apparatus according to claim 2, wherein
    the control unit is configured to execute the automatic parking process including a parking space detecting process that detects the parking space, by using a detection signal of the obstacle detecting unit disposed in a front side with respect to a front-back direction of the vehicle and an image signal from the image acquiring unit disposed on the front side, and a detection signal of the obstacle detecting unit disposed on one side with respect to a vehicle width direction of the vehicle and an image signal of the image acquiring unit disposed in the one side; and defining the parking space detecting process executed when the obstacle detecting unit and the image acquiring unit used for the parking space detecting process are in a normal state, to be a first parking space detecting process, the control unit is configured to execute, in the parking space detecting process, a second parking space detecting process different from the first parking space detecting process or execute a stop process stopping the first parking space detecting process as the fault handling process, in the case where a fault occurs on either the obstacle detecting unit or the image acquiring unit used for the parking space detecting process.

4. The parking assist apparatus according to claim 2, wherein the control unit is configured to execute the automatic parking process including an angle adjusting process that changes an angle of the vehicle with respect to the parking space, by using a detection signal from the obstacle detecting unit disposed on a front side with respect to a front-back direction of the vehicle and an image signal of the image acquiring unit disposed on the front side, and a detection signal of the obstacle detecting unit disposed on one side with respect to a vehicle width direction of the vehicle and an image signal from the image acquiring unit disposed in the one side; and defining the angle adjusting process executed when the obstacle detecting unit and the image acquiring unit used for the angle adjusting process are in the normal state, to be a first angle adjusting process, the control unit is configured to execute, in the angle adjusting process, a second angle adjusting process different from the first angle adjusting process or execute a stop process stopping the first angle adjusting process as the fault handling process, in the case where a fault occurs in either the obstacle detecting unit or the image acquiring unit used for the angle adjusting process.

5. The parking assist apparatus according to claim 2, wherein the control unit is configured to execute the automatic parking process including a parking process for parking the vehicle in the parking space, by using a detection signal from the obstacle detecting unit disposed in a rear side with respect to a front-back direction of the vehicle and an image signal from the image acquiring unit disposed on the rear side, and a detection signal from the obstacle detecting unit disposed on one side with respect to a vehicle width direction of the vehicle and an image signal of the image acquiring unit disposed in the one side; and defining the parking process executed when the obstacle detecting unit and the image acquiring unit used for the parking process are in the normal state, to be a first parking process, the control unit is configured to execute, in the parking process, a second parking process different from the first parking process or execute a stop process stopping the first parking process as the fault handling process, in the case where a fault occurs on either the obstacle detecting unit or the image acquiring unit used for the parking process.

6. The parking assist apparatus according to claim 3, wherein the parking assist apparatus further comprises a braking unit that produces a braking force to the vehicle;

the control unit is configured to enable, when executing the automatic parking process, an emergency braking control in the case where the obstacle detecting unit and the image acquiring unit used for the automatic parking process operation are in the normal state, and to disable, when executing the automatic parking process, an emergency braking control in the case where a fault occurs on either the obstacle detecting unit or the image acquiring unit used for the automatic parking process.

7. The parking assist apparatus according to claim 2, wherein the obstacle detecting unit is disposed at each of both sides in a vehicle width direction of the vehicle and includes a plurality of detecting units arranged in a front-back direction of the vehicle;

the control unit is configured to maintain, when executing the automatic parking process, the automatic parking process even when a fault occurs on some of the plurality of detecting units arranged in the front-back direction.

* * * * *